US007311247B1

(12) United States Patent
Lenner

(10) Patent No.: US 7,311,247 B1
(45) Date of Patent: Dec. 25, 2007

(54) ELECTRONIC LOCKOUT/TAGOUT SYSTEMS

(75) Inventor: Joseph Lenner, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 387 days.

(21) Appl. No.: 09/938,227

(22) Filed: Aug. 23, 2001

(51) Int. Cl.
*G06K 5/00* (2006.01)

(52) U.S. Cl. .................................................... 235/380

(58) Field of Classification Search ........ 235/375-386; 340/5.1-5.92, 3-3.9; 700/16; 307/10.5, 307/10.2

See application file for complete search history.

(56) References Cited

U.S. PATENT DOCUMENTS 4,769,765 A * 9/1988 Green ......................... 700/16
4,837,822 A 6/1989 Crosley et al.
5,309,351 A * 5/1994 McCain et al. ................ 700/3
5,508,691 A * 4/1996 Castleman et al. ........ 340/5.24
5,796,179 A * 8/1998 Honaga ..................... 307/10.5
5,970,437 A 10/1999 Gorman et al.
6,070,442 A 6/2000 Neeley et al.
6,417,760 B1 * 7/2002 Mabuchi et al. ............. 340/5.3
6,549,130 B1 * 4/2003 Joao .......................... 307/10.2

* cited by examiner

*Primary Examiner*—Jamara A. Franklin
(74) *Attorney, Agent, or Firm*—Amin Turocy & Calvin LLP; R. Scott Speroff

(57) ABSTRACT

A system for electronically controlling physical operation of dangerous equipment is provided. The system reads data from an electronic key and controls the flow of electricity, air, water and/or hydraulic fluid, for example, to a piece of dangerous equipment. The system includes electronic keys that store electronic key data and an electronic key reader that reads the electronic key data. The electronic key data analyzer analyzes the electronic key data and produces disconnect control data based on the electronic key data and other information like the status of the dangerous equipment. The system further includes a disconnector that can disable the piece of dangerous equipment based on the disconnect control data. The disconnector can also re-enable the piece of dangerous equipment. When operated in a networked environment, the system can perform actions like logging data, scheduling personnel and material, and performing EDI for pieces of dangerous equipment and related equipment.

28 Claims, 17 Drawing Sheets

PRIOR ART FIG. 1

ELECTRONIC LOCKOUT/TAGOUT SYSTEMS

TECHNICAL FIELD

The present invention relates generally to data processing, and in particular to a system for electronically disabling operation of dangerous equipment.

BACKGROUND

Conventionally, disabling dangerous equipment has been controlled, if at all, by physical locks that can be attached to one or more disconnecting devices associated with the dangerous equipment. For example, a large press (e.g., 50 ton press) may require electricity and/or hydraulic fluid to operate. A repair technician will typically have a certain number of locks in his/her toolbox at all times. Such locks will have the repair technician's name or identifying mark on them. Alternatively, a repair technician may need to acquire such a lock from a central repository. When a repair technician, for example, wants to work on the large press (e.g., replace a fitting), the repair technician may employ one such physical lock from. The physical lock has only one key and the repair technician will hold that key. The repair technician will then manipulate a disconnecting device that is operable to disable the operation of the large press, and physically lock that disconnecting device in a physical position that maintains the large press in a disabled state. The physical locks may be distinct and personnel may know that the locks are safety devices and that they are not to remove such locks (e.g., with bolt cutters). Thus, the repair technician can perform the repairs on the large press secure in the knowledge that the press is inoperable. Thus, accidents are avoided.

But such conventional systems suffer from some drawbacks. By way of illustration, there may be a finite number of physical locks for a site. Thus, if the repair technician does not have enough locks in his/her own toolbox, and/or the central inventory of locks is reduced to zero by other technicians working on the site, the technician may not be able to perform a shutdown. Thus, necessary repairs may be delayed or the repair technician may attempt the repair without the dangerous equipment being disabled. By way of further illustration, in a large plant (e.g., 1 million square feet) the physical lock inventory may be located an undesirable distance (e.g., 1 mile) from the location where the device to be locked is located. Thus, there may be delays in acquiring a physical lock, and/or a person desiring to work on a piece of dangerous equipment may forego acquiring the lock, creating an unsafe condition. By way of still further illustration, to repair one piece of dangerous equipment (e.g., a stone crusher), may require other pieces of dangerous equipment to be disabled (e.g., a conveyor). Such other pieces of dangerous equipment may be located in separate physical locations, and such disabling may require the interaction of different personnel (e.g., electrician from electrical union, pipe fitter from pipe fitter union), which can create coordination, scheduling and control problems. By way of still further illustration, there are situations that require a large number of maintenance personnel to work on a single piece of equipment. In this case it become impractical to place many locks on many devices and ensure that the people working on the machine(s) know where each disconnection device and/or lock is located, which creates coordination issues, which can be exacerbated in plants with long lines.

Conventional physical lock systems, which may be associated with traditional paper based record keeping systems, may not promote accurate record-keeping, logging and scheduling. Thus, with conventional systems, opportunities for gathering data that could facilitate data analysis are missed. Thus, there remains a need for an improved system and method to disable dangerous equipment.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system that facilitates electronically disabling dangerous equipment through the use of electronic keys, electronic key readers, data analyzers and electronically controlled disconnecting devices. Such disconnecting systems may be stand alone devices (e.g., one separate device per piece of dangerous equipment) and/or may be networked together with or without central monitoring and/or control. For example, a large band saw may require electricity to run. A safety inspector may desire access to the band saw to check the tension in the band. The safety inspector may thus be able to acquire an electronic key that can be read by a key reader. The key may be coded with information concerning the holder of the key, the task the key holder desires to perform, the approximate time estimated for the performance of the task, medical information associated with the key holder and other information. The safety inspector may then present the electronic key to an electronic key reader associated with the band saw, and the electronic key reader will read the information from the key. The key reader may be, for example, a swipe device (e.g., magnetic stripe reader) or a radio receiver. The electronic key reader may then pass the information to an analyzer that will determine whether actions including, but not limited to, disabling the piece of dangerous equipment, and if so, how and when such disabling will occur, slowing the operation of the piece of equipment, routing work to an alternate piece of equipment, and so on. It is to be appreciated that disabling equipment is one possible action and that it may, in some situations, not be a viable decision. For example, a band saw operating at maximum r.p.m. on a job that must be completed in the next five minutes may not be immediately disabled. Similarly, if the safety inspector arrives at the wrong band saw (e.g., in a mill with one hundred such band saws), then the band saw may not be disabled, and the inspector may be directed to the correct band saw.

Once an analyzer has determined that a piece of dangerous equipment will be disabled, the analyzer may generate disconnect control information that is sent to a disconnecting device. For example, the analyzer associated with the band saw may send control information to an electrical disconnect device, that will perform proper shutdown procedures for the band saw (e.g., spinning it down from maximum r.p.m. to a standstill, raising/lowering proper gates, disengaging the clutch, etc.). The disconnecting device can then report to the inspector that the equipment is disabled, and that access to the dangerous equipment is now allowed.

In one example of the present invention, the reading, analysis and disconnecting can be logged electronically, which facilitates more accurate and meaningful record keeping. For example, downtimes for different models of equipment can be compared, which can lead to scheduling decisions for material and personnel that use such equipment, and which may affect future purchasing decisions. Furthermore, such record keeping can facilitate Electronic Data Interchange (EDI), where actions like part ordering, material ordering, service scheduling and warranty updating can occur automatically through the transfer of electronic data. Such record keeping may be performed on an individual basis by stand alone systems and/or may be performed centrally for a collection of machines.

Employing such central monitoring and/or control of electronically controlled disconnect devices can solve problems associated with conventional systems. By way of illustration, in the situation where the physical devices were physically separate (e.g., crusher, conveyor), coordinating the shutdown of such devices is facilitated through such central control, which can increase safety and reduce overall down time. By way of further illustration, in the situation where there are a finite number of physical locks, by dynamically coding electronic keys on an as-needed basis, there may be a larger supply of keys available, which can reduce delays. By way of still further illustration, in the situation where the physical locks were located an undesirable distance from the dangerous equipment to be disabled, one electronic key may be remotely programmable at the key reader associated with the dangerous equipment and thus become operable to disable a device without having to return to the central location where the physical locks are stored. Thus, less time may be spent acquiring the lock, and therefore safety risks (e.g., accessing equipment without a lock) may be reduced.

In accordance with an aspect of the present invention, a system for electronically controlling physical operation of dangerous equipment is provided. The system includes an electronic key that stores electronic key data and an electronic key reader that can read the electronic key data from the electronic key. The electronic key reader is connected to an electronic key data analyzer that analyzes the electronic key data and produces disconnect control data based on the electronic key data. The disconnect data is sent to a disconnector that can disable and re-enable the operation of a piece of dangerous equipment based on the disconnect control data.

Another aspect of the present invention provides a system for electronically controlling physical operation of dangerous equipment where the system includes a computer network connected to electronic key readers, electronic key data analyzers, disconnectors and dangerous equipment. The computer network carries signals between the electronic key readers, the electronic key data analyzers, the disconnectors and the dangerous equipment. Such signals can be employed to disable and/or re-enable the operation of the dangerous equipment, to display information (e.g., technical, safety, status) and to log data, schedule equipment operation and facilitate EDI.

Another aspect of the present invention provides a system for electronically controlling the operation of dangerous equipment where the system includes a central station connected to a computer network that connects the components of the system. The central station can disable and re-enable the operation of one or more pieces of dangerous equipment and equipment related to the dangerous equipment. Furthermore, the central station can be employed to facilitate displaying information (e.g., technical, safety, status), logging data, scheduling equipment operation and performing EDI.

Another aspect of the present invention provides a computer readable medium having computer executable components of a system for electronically controlling physical operation of dangerous equipment. The components include an electronic key reading component that reads electronic key data from an electronic key and an electronic key data analyzing component that analyzes the electronic key data and produces disconnect control data. The computer readable medium further stores a disconnecting component that can disable and re-enable the operation of dangerous equipment.

Yet another aspect of the present invention provides a data packet adapted to be transmitted from a first computer process to a second computer process. The data packet includes disconnect data related to disabling and/or re-enabling one or more pieces of dangerous equipment. The disconnect data is generated by a key analyzer in response to analysis performed on one or more pieces of electronic key data read from an electronic key by an electronic key reader.

Another aspect of the present invention provides a method for electronically controlling physical operation of dangerous equipment. The method includes collecting electronic key data and locally analyzing the electronic key data to produce disconnect data based on the electronic key data and the status of dangerous equipment. The method further includes locally controlling the operation of dangerous equipment. The method further includes locally logging data associated with the collected electronic key data, the disconnect data and/or the dangerous equipment operation. The method further includes locally scheduling the operation of dangerous equipment based on the logged data, the electronic key data and/or the disconnect data. The method further includes locally engaging in or more electronic data interchanges and displaying technical manual data, schedule data, equipment identification data, equipment status information and/or safety manual data.

Yet another aspect of the present invention provides a method for electronically controlling physical operation of dangerous equipment. The method includes collecting electronic key data and centrally analyzing the electronic key data to produce disconnect data based on the electronic key data, the status of one or more pieces of dangerous equipment, the status of one or more pieces of related equipment and/or the identity of the dangerous equipment. The method further includes centrally controlling the operation of dangerous equipment and/or related equipment based on the disconnect data. The method further includes centrally logging data associated with the collected electronic key data, the disconnect data and/or the dangerous equipment operation and centrally scheduling the operation of dangerous equipment and/or related equipment based on the logged data, the electronic key data and/or the disconnect data. The method further includes centrally engaging electronic data interchanges and displaying technical manual data, schedule data, equipment identification data, equipment status information and/or safety manual data.

To the accomplishment of the foregoing and related ends, the invention, then, comprises the features hereinafter fully described and particularly pointed out in the claims. The following description and the annexed drawings set forth in detail certain illustrative aspects of the invention. These aspects are indicative of but a few of the various ways in which the principles of the invention may be employed.

Other objects, advantages and novel features of the invention will become apparent from the following detailed description of the invention when considered in conjunction with the drawings.

BRIEF DESCRIPTION OF THE DRAWINGS

Prior Art

DETAILED DESCRIPTION

Figure 1:
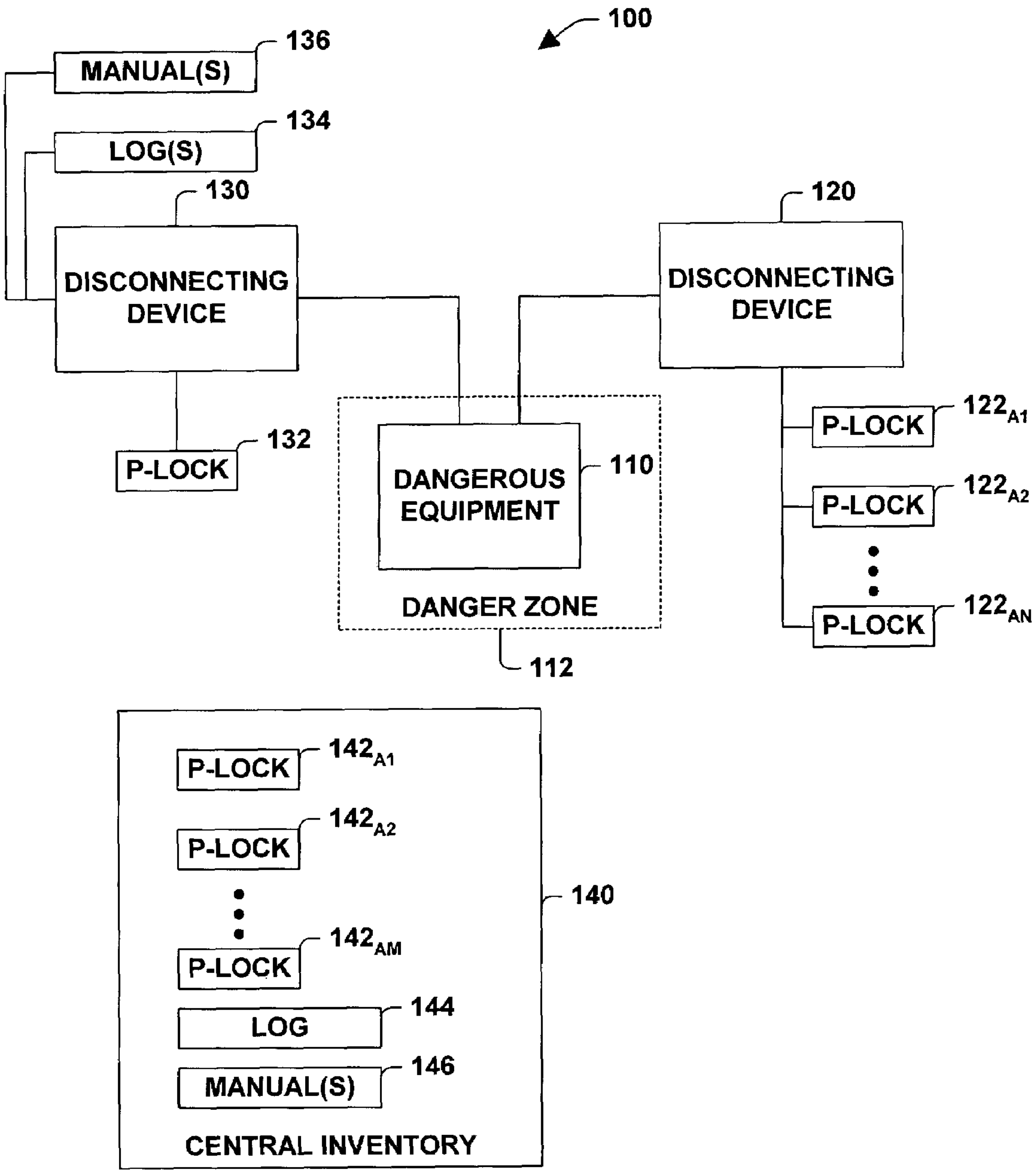
FIG. 1 is a schematic block diagram of a system for physically disconnecting and locking a piece of dangerous equipment.

The present invention will now be described with reference to the drawings, wherein like reference numerals are used to refer to like elements throughout. The present invention will be described with reference to a system for enabling and disabling the operation of dangerous equipment. The following detailed description is of the best modes presently contemplated by the inventors for practicing the invention. It should be understood that the description of these aspects are merely illustrative and that they should not be taken in a limiting sense.

Prior Art FIG. 1 is a schematic block diagram of a conventional system 100 for physically disconnecting and locking a piece of dangerous equipment 110. The piece of dangerous equipment 110 may be, for example, a press, a lathe, a crusher, a saw, a sander, a joiner, a planer, a welder, a robot, a conveyor, a grinder, an electrical device, a hot device and other such similarly dangerous entities. The piece of dangerous equipment 110 may have an associated danger zone 112. For example, it may be dangerous to stand within ten feet of a certain piece of electrical equipment, it may be dangerous to work within three feet of a certain press, or it may be dangerous to work in, on and/or around a certain saw. Given the danger zone 112, which may be outside the piece of equipment 110 and/or inside the piece of equipment 110, conventional systems have been developed to disconnect the dangerous equipment 110 and to lock the dangerous equipment 110 in such a disconnected state.

Such conventional systems 100 have traditionally relied on physical locks. For example, a physical lock (p-lock) 132 may be attached to a disconnecting device 130. By way of illustration, the disconnecting device 130 may be a circuit breaker that controls the flow of electricity to the piece of dangerous equipment 110. The physical lock 132 may be attached to the circuit breaker to ensure that the breaker remains opened, preventing the flow of electricity, while the person who placed the physical lock 132 on the breaker works in, on and/or around the piece of dangerous equipment 110. For example, an engineer may desire to configure the piece of equipment 110, which requires accessing one or more moving parts of the equipment 110. Thus, the engineer may acquire the physical lock from a central inventory 140 of such locks and/or from a personal store of locks (e.g., repair technician's toolbox), open the disconnecting device 130 (e.g., the breaker) and place the physical lock 132 on the disconnecting device to ensure that the equipment 110 does not operate while the engineer is working on the equipment 110, thus increasing safety.

The disconnecting device 130 and/or the dangerous equipment 110 may be associated with one or more logs 134 and one or more manuals 136. Such logs and manuals may be employed to record work performed on the equipment 110, to order parts needed for repairs, to provide safety and/or technical information about the disconnecting device 130 and/or the equipment 110 and other such information.

While the disconnecting device 130 is illustrated as being associated with one physical lock 132, it is to be appreciated that more than one physical lock may be associated with a disconnecting device at one time. For example, the disconnecting device 120 is illustrated as having the physical locks $\mathbf{122}_{A1}$ through $\mathbf{122}_{AN}$, N being an integer attached. Such a situation may arise when more than one repair person is working on a piece of equipment. Each such repair person may wish to ensure their safety, and thus, each such repair person would attach their own physical lock. A problem with such a system can arise when the disconnecting device 120 has fewer positions available for physical locks than are required to allow each repair person to attach their own physical lock. For example, a large piece of dangerous equipment may be two hundred feet long, one hundred feet wide and fifty feet high, with over a thousand moving parts. Thus, it is conceivable that three repair personnel may work on the piece of dangerous equipment at the same time, with a supervisor also attending. Thus, to ensure safety, four physical locks should be attached to the disconnecting device associated with the large piece of equipment. But if the disconnecting device can only accommodate three such physical locks, the safety of the fourth person may be in jeopardy if extra disconnecting locking equipment is not available.

The central inventory 140 may be a repository for one or more physical locks (e.g., p-lock $\mathbf{142}_{A1}$ through $\mathbf{142}_{AM}$, M being an integer), one or more logs 144 and/or one or more manuals 146. Again, such logs 144 and/or manuals 146 may be employed to record work performed on one or more pieces of equipment, to order parts needed for repairs, to provide safety and/or technical information about one or more disconnecting devices 130 and/or equipment and other such information, in a centralized manner. But the central inventory 140 may be inconveniently located with respect to the dangerous equipment 110 and/or the disconnecting device 130, which can create problems. Furthermore, there may be a small, finite number of physical locks available for a site, which can create other problems. Thus, the central inventory, physical disconnector, physical lock system suffers from problems and has limitations and there remains a need for an improved system and method for disabling and re-enabling dangerous equipment.

Figure 2:
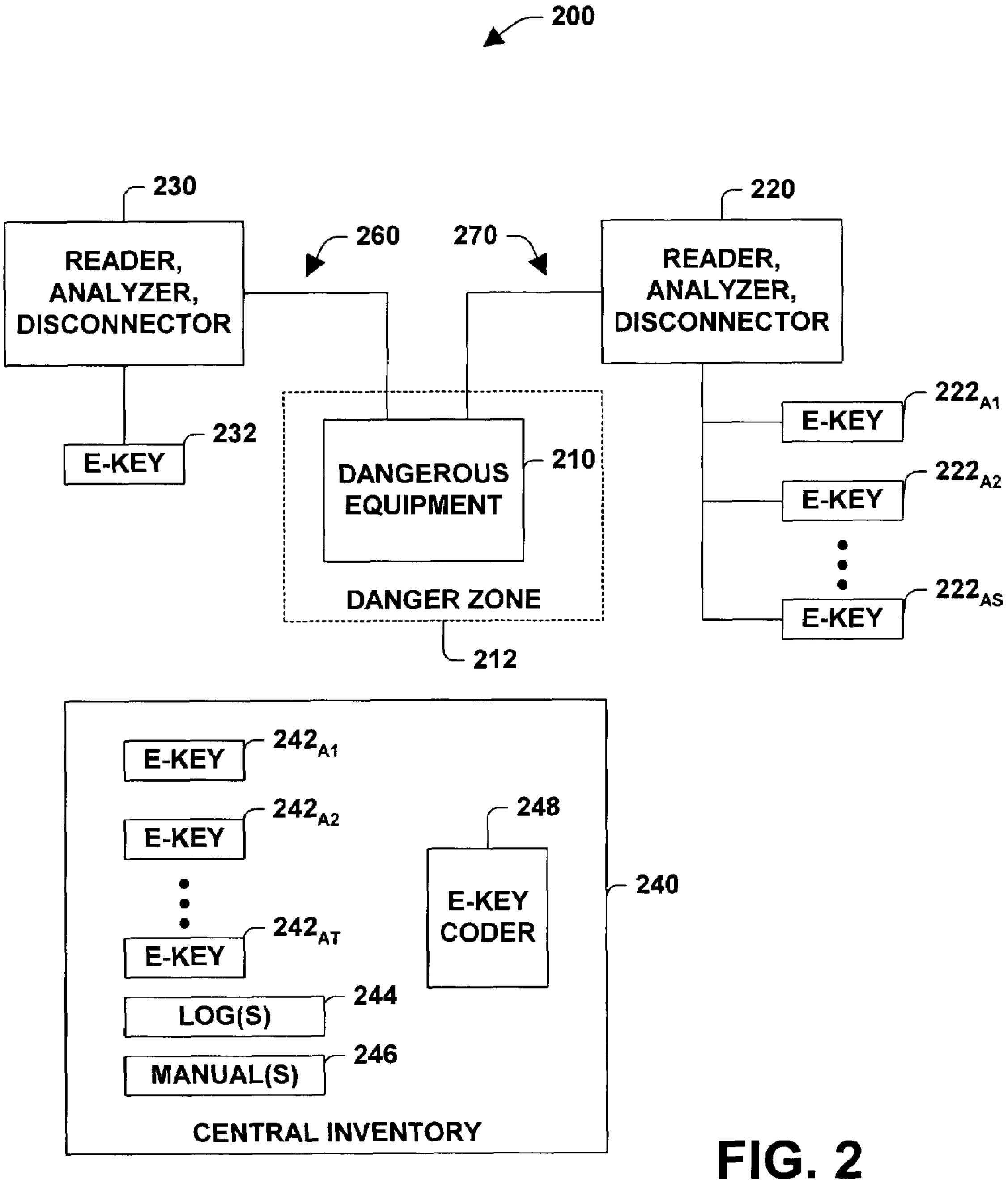
FIG. 2 is schematic block diagram of a system for electronically disabling and/or enabling the operation of a piece of dangerous equipment.

FIG. 2 illustrates a system 200 for electronically disabling and/or enabling the operation of a piece of dangerous equipment 210. The piece of dangerous equipment 210 may be, for example, a press, a lathe, a crusher, a saw, a sander, a joiner, a planer, a welder, a robot, a conveyor, a grinder, an electrical device, a hot device, a radiation generating device and other such similarly dangerous entities. The piece of dangerous equipment 210 may have an associated danger zone 212. For example, it may be dangerous to stand within ten feet of a certain piece of electrical equipment, it may be dangerous to work within three feet of a certain press, or it may be dangerous to work in, on and/or around a certain radiation generator. Given the danger zone 212, which may be outside the piece of equipment 210 and/or inside the piece of equipment 210, the present invention provides the system 200 for disabling and re-enabling the piece of equipment 210.

The present invention employs an electronic key (e-key) that carries electronic key data that can be read by an electronic key reader. The present invention further employs an electronic data analyzer that can analyze the electronic key data to produce disconnect control data that can be employed to disable and/or re-enable the dangerous equipment 210.

For example, an e-key 232 may be employed to carry electronic key data associated with an electronic key holder and/or associated with disabling and/or re-enabling the dangerous equipment 210. The e-key 232 may be presented to a disabling component 230. The disabling component 230 can perform actions including, but not limited to, reading the electronic key data, analyzing the electronic key data and producing disconnect control data. In one example of the present invention, the disabling component 230 may gather status information from the dangerous equipment 210 employing a safe connection 260, and may similarly transmit disconnect control data to the dangerous equipment 210 via the safe connection 260.

As used in this application, the term "component" is intended to refer to a computer-related entity, either hardware, a combination of hardware and software, software, or software in execution. Thus, the disabling component 230 may be, but is not limited to being, a process running on a processor, a processor, an object, an executable, a thread of execution, a program and a computer. By way of illustration, both an application running on a computer and the computer can be components. One or more components may reside within a process and/or thread of execution and a component may be localized on one computer and/or distributed between two or more computers.

Thus, in one example aspect of the present invention the enabling component 230 is a computer with an e-key reader, an e-key data analyzer and a disconnector. The e-key reader may read the e-key data by methods including, but not limited to, reading a magnetic strip on an electronic key inserted in the e-key reader, receiving a radio frequency signal from an e-key in transmission range of the e-key reader and reading digital data from an integrated circuit memory chip on an e-key presented to an e-key reader. It will be appreciated that other systems and methods for storing and conveying electronic data from an e-key to an e-key reader can be employed in accordance with the present invention. Thus, improvements over conventional systems where only a physical key may be employed to lock/unlock a physical lock attached to a disconnecting device are provided. For example, one e-key may work with more than one disabling device 230, and thus the number of keys and locks can be reduced, with corresponding reductions in management and control of such physical keys and locks.

The information stored on the e-key can include, but is not limited to key identifying information, key holder identity information, key holder medical information, key holder equipment access permissions, key holder equipment qualifications, key holder supervisor contact information, key holder security information and key holder task. Thus, improvements over conventional systems can be achieved through analysis of such data. For example, in conventional systems, a repair technician may "repair" the wrong piece of equipment since the physical lock and key provide no feedback concerning whether the repair technician is accessing the correct piece of equipment. But the present invention facilitates providing such feedback by encoding task information on the e-key 232 and by facilitating storing equipment identification information in the disabling component 230.

The disabling component 230 can generate disconnect control data that can be employed to disable the dangerous equipment 210. Such disconnect control data can be employed to restrict flows including, but not limited to, the flow of electricity, air, water and hydraulic fluid to the dangerous equipment 210. Such disconnect control data may be transmitted as one or more data packets that travel between disabling component 230 and the dangerous equipment 210 via the safe connection 260 and/or which travel between the reading, analyzing and/or disconnecting components of the disabling component 230.

While the disabling component 230 is illustrated as being associated with one e-key 232, it is to be appreciated that more than one e-key may be associated with a disabling component. For example, a large and/or complicated piece of dangerous equipment may require that several technicians work on the equipment at the same time. Thus, the disabling component 220, which contains reading, analyzing and disconnecting components substantially similar to those of the disabling component 230, may be associated with more than one e-key. For example, the e-keys $\mathbf{222}_{A1}$ through $\mathbf{222}_{AS}$ (S being an integer) are illustrated. Similar to the transmission of data along the safe connection 260, the disabling component 220 and the dangerous equipment 210 may communicate via a separate safe connection 270. By allowing interactions with multiple e-keys, problems with conventional systems can be mitigated. By way of illustration, in the situation where more workers require access to dangerous equipment than there are conventional physical lock locations, a worker may not be able to place a physical lock and thus may have their safety compromised. But the present invention facilitates employing a larger number of e-keys to disable the dangerous equipment 210 so that a larger number of workers may work on the dangerous equipment 210 without having their safety compromised through the absence of a lock.

The present invention may employ a central inventory 240 where e-keys (e.g., e-keys $\mathbf{242}_{A1}$ through $\mathbf{242}_{AT}$, T being an integer) are available, along with one or more logs 244 and/or manuals 246. In FIG. 2 the central inventory 240 is physically and/or logically separate from the disabling component 230 and the dangerous equipment 210. Through storing electronic data on the e-key, processing associated with the logs 244 and/or the manuals 246 may be computerized, providing advantages over conventional paper based systems. For example, tracking e-keys can be automated, reducing the amount of time and paper spent tracking physical keys.

The central inventory 240 may include an e-key coder 248 that can be employed to dynamically program and/or reprogram e-keys. For example, e-keys may be programmed with information including, but not limited to, the issuer of the e-key, the person who authorized issuing the e-key, the identity of the person to whom the e-key was issued, the dangerous equipment for which the e-key holder is granted disable authority, a time period during which the e-key is valid, a time by which the e-key must be returned, a list of related e-key holders (e.g., repair team, supervisor), a task that the e-key holder is supposed to perform, medical information associated with the e-key holder (e.g., allergies, contact information, prescriptions, previous radiation exposure dosages) and the like. Thus, rather than a physical key, which carries no information about the holder of the key, the e-key can be programmed to facilitate increasing safety by increasing management and control of e-keys encoded with encoding such information.

While one piece of dangerous equipment is illustrated in FIG. 2, it is to be appreciated that one disabling component can be operably connected to one or more pieces of dangerous equipment. As used herein, the term "operably connected" refers to a juxtaposition such that the normal function(s) of the connected entities can be performed. Thus, a disabling component will be able to disable the operation of a piece of dangerous equipment. Such disabling components may be located near the dangerous equipment (e.g., within 100 feet) and/or far from the dangerous equipment (e.g., beyond 100 feet, in another part of the site, in another building). Similarly, while two disabling components are illustrated connected to the dangerous equipment 210, it is to be appreciated that one or more such disabling components can be connected to the dangerous equipment.

Figure 3:
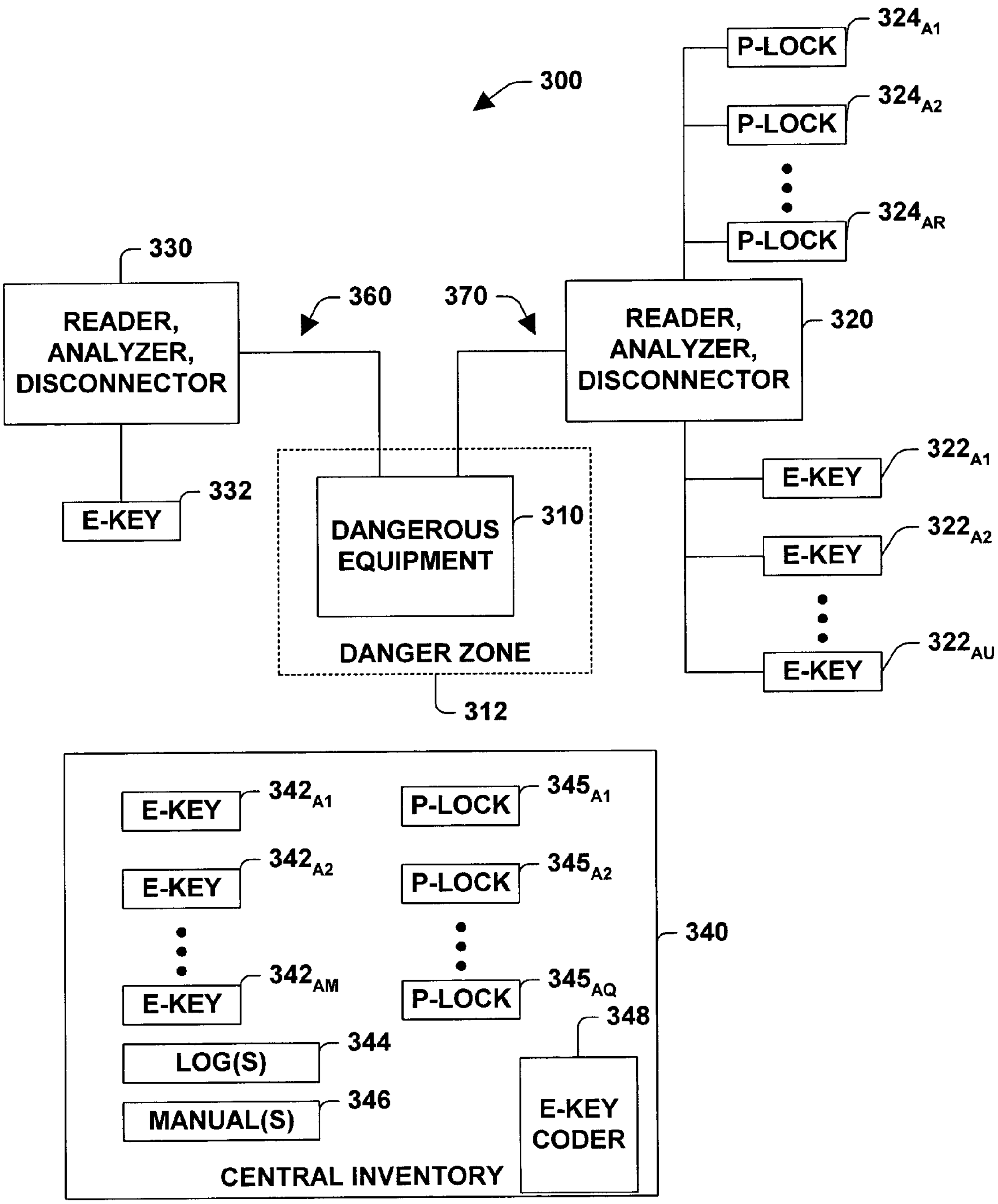
FIG. 3 is a schematic block diagram of a system for electronically disabling and/or enabling the operation of a piece of dangerous equipment, where the system is further able to interact with conventional physical locks.

Turning now to FIG. 3, a system 300 for electronically disabling a piece of dangerous equipment 310 is illustrated. In addition to a disabling component 330 substantially similar to the disabling component 230 (FIG. 2), the system 300 includes a disabling component 320 that in addition to being substantially similar to the disabling component 220 (FIG. 2) also facilitates employing e-keys and/or physical locks (p-locks). In addition to interacting with one or more e-keys (e.g., e-keys $\mathbf{322}_{A1}$ through $\mathbf{322}_{AU}$, U being an integer), the disabling component 320 may interact with one or more p-locks (e.g., p-lock $\mathbf{324}_{A1}$ through $\mathbf{324}_{AR}$, R being an integer). Thus, workers who prefer to interact with conventional physical lock systems can toil side by side with workers who prefer to interact with e-keys, which may mitigate phase-in and acceptance of the system 300. Furthermore, providing the ability to interact with p-locks facilitates producing a fault-tolerant system 300 that can be employed during power down situations (e.g., a blackouts) or at times when the electronic system may not function properly (e.g., sunspots, radio frequency interference).

The system 300 may also include a central inventory 340 that incorporates substantially the same functions as the central inventory 140 (FIG. 1) and the additional functionality of the central inventory 240 (FIG. 2). Thus, the central inventory 340 may include an e-key coder 348 that may be employed to program e-keys, and which may further be employed to produce electronic tags that can be associated with the physical locks. For example, the e-key coder 348 may produce a pair of bar coded strips, one of which may be fastened around the wrist of the worker acquiring the p-lock and the other of which may be attached to the p-lock. Thus, although an e-key is not produced for the p-lock, some information (e.g., identify of worker, time out) may be encoded in the bar code, which can facilitate improving management and control of the p-locks. Further, such barcoding may be employed to facilitate automating conventional paper based systems associated with tracking the p-locks. It is to be appreciated that although bar codes are discussed in connection with the e-key coder 348 that other information coding systems may be employed in accordance with the present invention.

Figure 4:
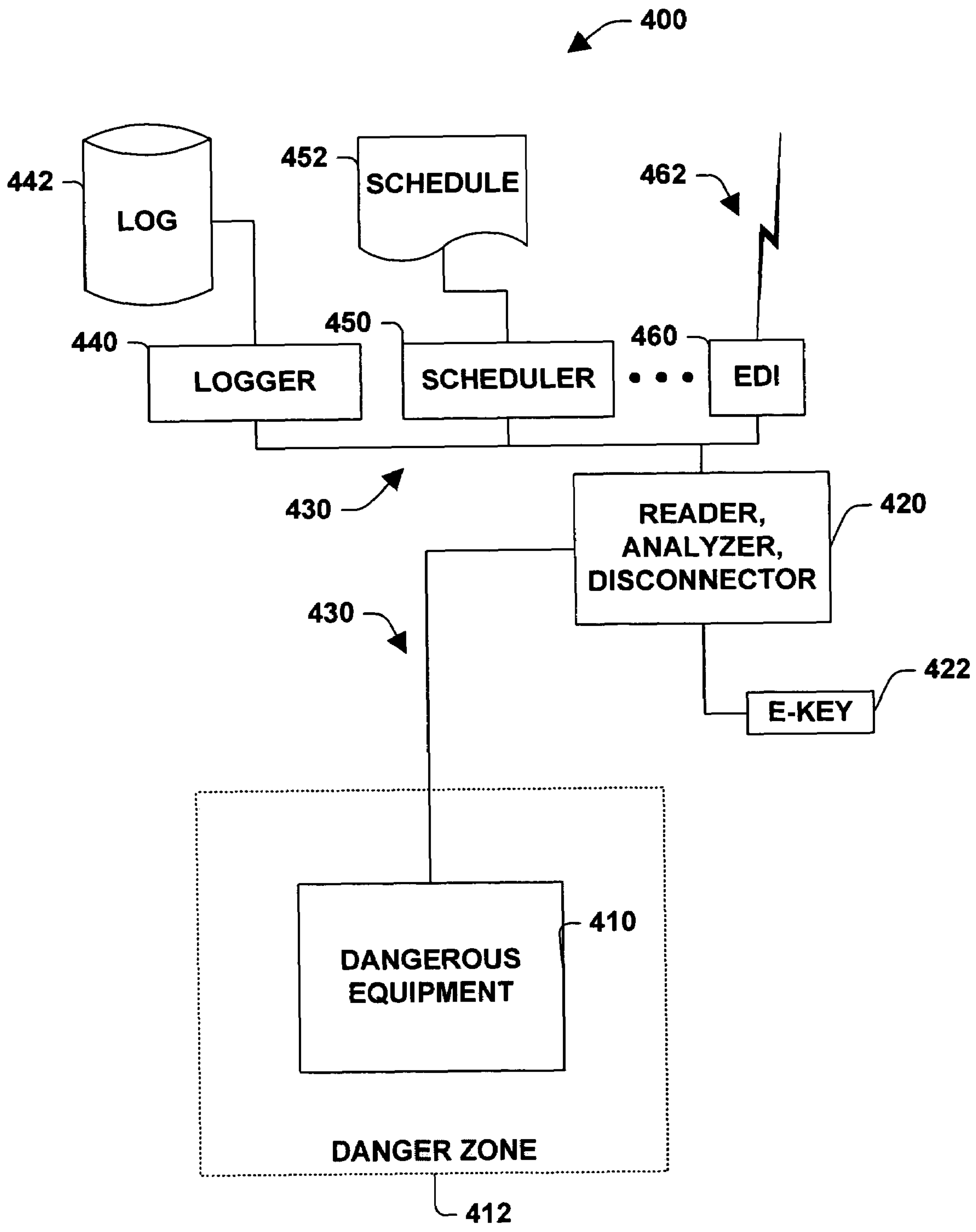
FIG. 4 is a schematic block diagram of a system for electronically disabling and/or enabling the operation of a piece of dangerous equipment, where the system is further able to perform functions like logging, scheduling and EDI exchanges.

FIG. 4 illustrates a system 400 for electronically disabling a piece of dangerous equipment 410 where the system 400 includes components like a logger 440, a scheduler 450 and an Electronic Data Interchange (EDI) 460 component. The system 400 includes one or more disabling components 420 that are substantially similar to the disabling component 320 (FIG. 3) and/or the disabling component 330 (FIG. 3). Thus, the disabling component 420 can perform e-key reading, e-key data analyzing and disconnect control data processing and can communicate with the dangerous equipment 410 via a safe connection 430.

In addition to reading functions similar to the reading functions of the disabling components 320 (FIG. 3) and 330 (FIG. 3), the disabling component 420 electronic key reader is further operable to perform actions including, but not limited to, logging electronic key data, logging times when the operation of the dangerous equipment 410 is disabled, logging times when the operation of the dangerous equipment 410 is enabled, logging electronic key holder medical information, logging electronic key holder tasks, logging electronic key holder identity, scheduling dangerous equipment 410 operation and performing electronic data interchange. Thus, the disabling component 420 is illustrated as being operably connected to the logger 440, which is in turn operably connected to a log 442. It is to be appreciated that the logger 440 may be a stand alone device and/or may be incorporated into the disabling component 420, and that the logger 440 may be a physical device and/or or a logical process. The logger 440 may communicate with the disabling component 420 via a safe connection 430. While the safe connection 430 is illustrated as having two separate paths, it is to be appreciated that the safe connection 430 may have one or more paths between the devices and/or processes for which it provides communication. As opposed to conventional systems, where if a log was maintained at all, it was likely maintained by hand (e.g., paper and pencil), the system 400, through the use of e-keys (e.g., e-key 422) facilitates gathering electronic data that may then be employed in data analysis known in the art (e.g., process control, quality control, industrial engineering applications, personnel management, inventory control, etc.), providing advantages over conventional systems.

The system 400 can also include a scheduler 450 operably connected to the logger 440, the disabling component 420, the dangerous equipment 410 and other components. Thus, the scheduler 450 can be employed to produce schedules 452 including, but not limited to, run time schedules for the dangerous equipment 410, run time schedules for related equipment, personnel schedules, maintenance schedules, just in time delivery of material schedules and the like. It is to be appreciated that the scheduler 450 may be a stand alone device and/or may be incorporated into the disabling component 420, and that the scheduler 450 may be a physical device and/or or a logical process. The scheduler 450 may communicate with the disabling component 420 via the safe connection 430.

The system 400 may also include an EDI component 460 which may employed to generate one or more EDI exchanges 462. The EDI component 460 may, therefore, engage in EDI exchanges concerning issues including, but not limited to, updating warranty information, reporting repair information, ordering replacement parts, updating billing records for the e-key holder and the like. Although three additional functions, (e.g., logging, scheduling, EDI exchange) are illustrated in FIG. 4, it is to be appreciated that other such functions are facilitated by employing the electronic disabling component 420 and the e-key 422 to control disabling and re-enabling the operation of the dangerous equipment 410.

Figure 5:
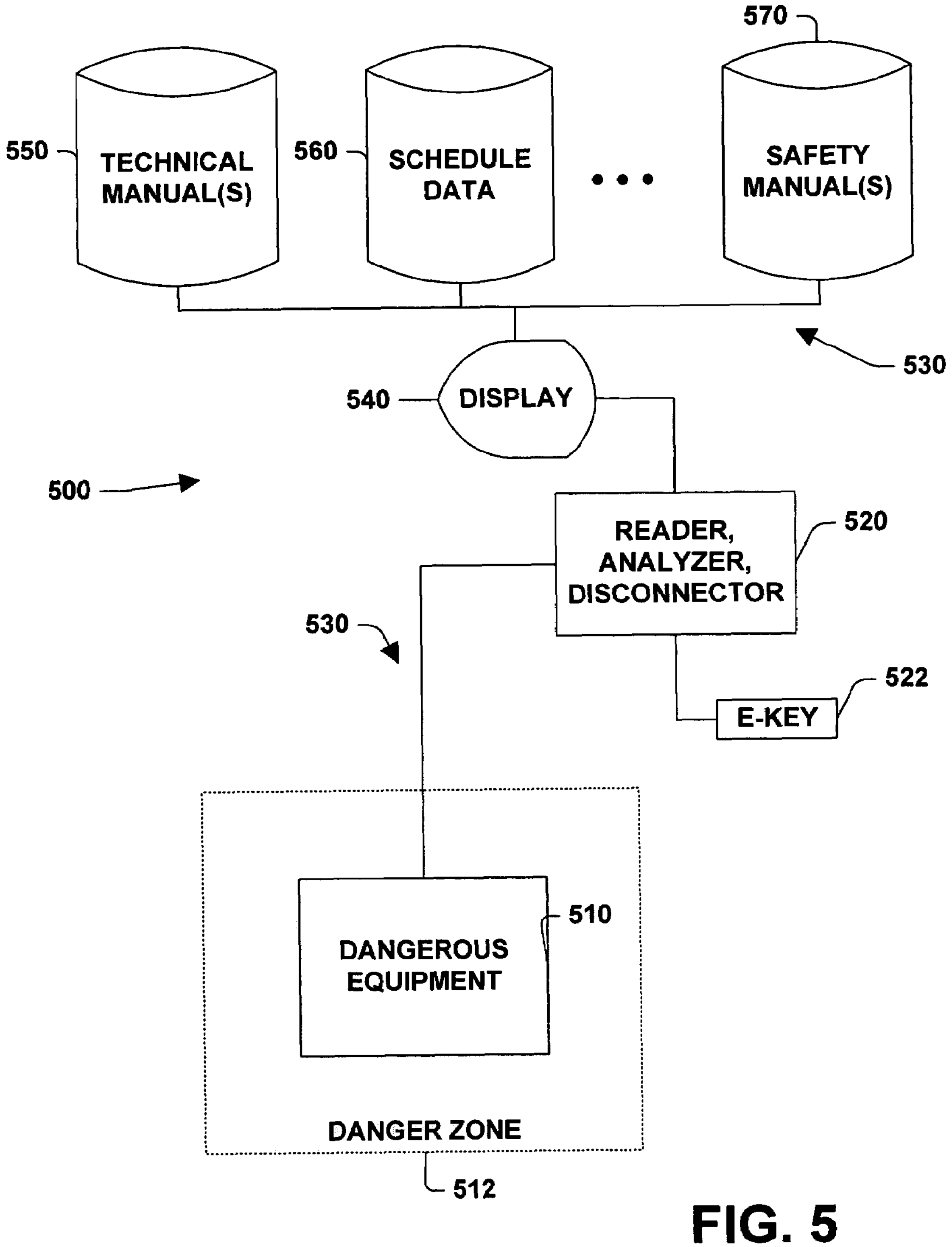
FIG. 5 is a schematic block diagram of a system for electronically disabling and/or enabling the operation of a piece of dangerous equipment, where the system further includes a display and thus is able to display information like technical manual data, schedule data and safety manual data.

FIG. 5 illustrates a system 500 for electronically disabling and/or re-enabling the operation of a piece of dangerous equipment 510. The system 500 includes one or more disabling components 520 that are substantially similar to previously described disabling components (e.g., disabling component 420 (FIG. 4)). Thus, the disabling component 520 can perform e-key reading, e-key data analyzing and disconnect control data processing. The disabling component 520 may communicate via a safe connection 530 with the dangerous equipment 510, a display 540 and one or more data stores.

In addition to the disabling component 520, the system 500 includes a display 540 that can be employed to present information including, but not limited to, technical manual data, schedule data, equipment identification data, equipment status information and safety manual data. Such technical manual data may be stored in one or more technical manual stores 550. The technical manual data store 550 can store data in data structures including, but not limited to one or more lists, arrays, tables, databases, stacks, heaps, linked lists and data cubes. The technical manual data store 550 can reside on one physical device and/or may be distributed between two or more physical devices (e.g., disk drives, tape drives, memory units). Further, the technical manual data store 550 may reside in one logical device and/or data structure. Similarly, schedule data may be stored in one or more schedule data stores 560. The schedule data store 560 can store data in data structures including, but not limited to one or more lists, arrays, tables, databases, stacks, heaps, linked lists and data cubes. The schedule data store 560 can reside on one physical device and/or may be distributed between two or more physical devices (e.g., disk drives, tape drives, memory units). Further, the schedule data store 560 may reside in one logical device and/or data structure. Similarly, safety manual data may be stored in one or more safety manual data stores 570. The safety manual data store 570 can store data in data structures including, but not limited to one or more lists, arrays, tables, databases, stacks, heaps, linked lists and data cubes. The safety manual data store 570 can reside on one physical device and/or may be distributed between two or more physical devices (e.g., disk drives, tape drives, memory units). Further, the safety manual data store 570 may reside in one logical device and/or data structure. It is to be appreciated that although three data stores (e.g., technical manual data store 550, schedule data store 560, safety manual data store 570) are illustrated, that a greater or lesser number of such data stores may be employed in accordance with the present invention.

Thus, information programmed onto an e-key (e.g., e-key 522) can be employed to retrieve data including but not limited to data relevant to the dangerous equipment 510 being accessed, the task to be performed on the dangerous equipment 510, procedures associated with disconnecting the dangerous equipment 510 and the like, with such data subsequently available for presentation on the display 540. Thus, improvements over conventional systems can be provided by automating information retrieval based on information programmed onto an e-key.

While FIGS. 2 through 5 primarily illustrate stand-alone disabling components connected individually to one or more pieces of dangerous equipment, it is to be appreciated that a computer network may be employed in accordance with the present invention. Thus, turning to FIG. 6, a system 600 for electronically disabling and re-enabling a piece of dangerous equipment 610 is illustrated, where the system 600 includes a computer network 660. The network 660, which is a safety related network, may be implemented using technologies including, but not limited to a local area network (LAN), a wide area network (WAN), the Internet, one or more intranets, an Ethernet, a token ring network and the like.

The system 600 includes one or more disabling components (e.g., disabling component 620, disabling component 630) that are substantially similar to previously described disabling components (e.g., 520 (FIG. 5)). Thus, the disabling components 620, 630 can perform e-key reading, e-key data analyzing and disconnect control data processing. However, rather than communicate individually via one or more safe connections (e.g., safe connection 260 (FIG. 2)), the disabling 620, 630 can communicate via the computer network 660.

Figure 6:
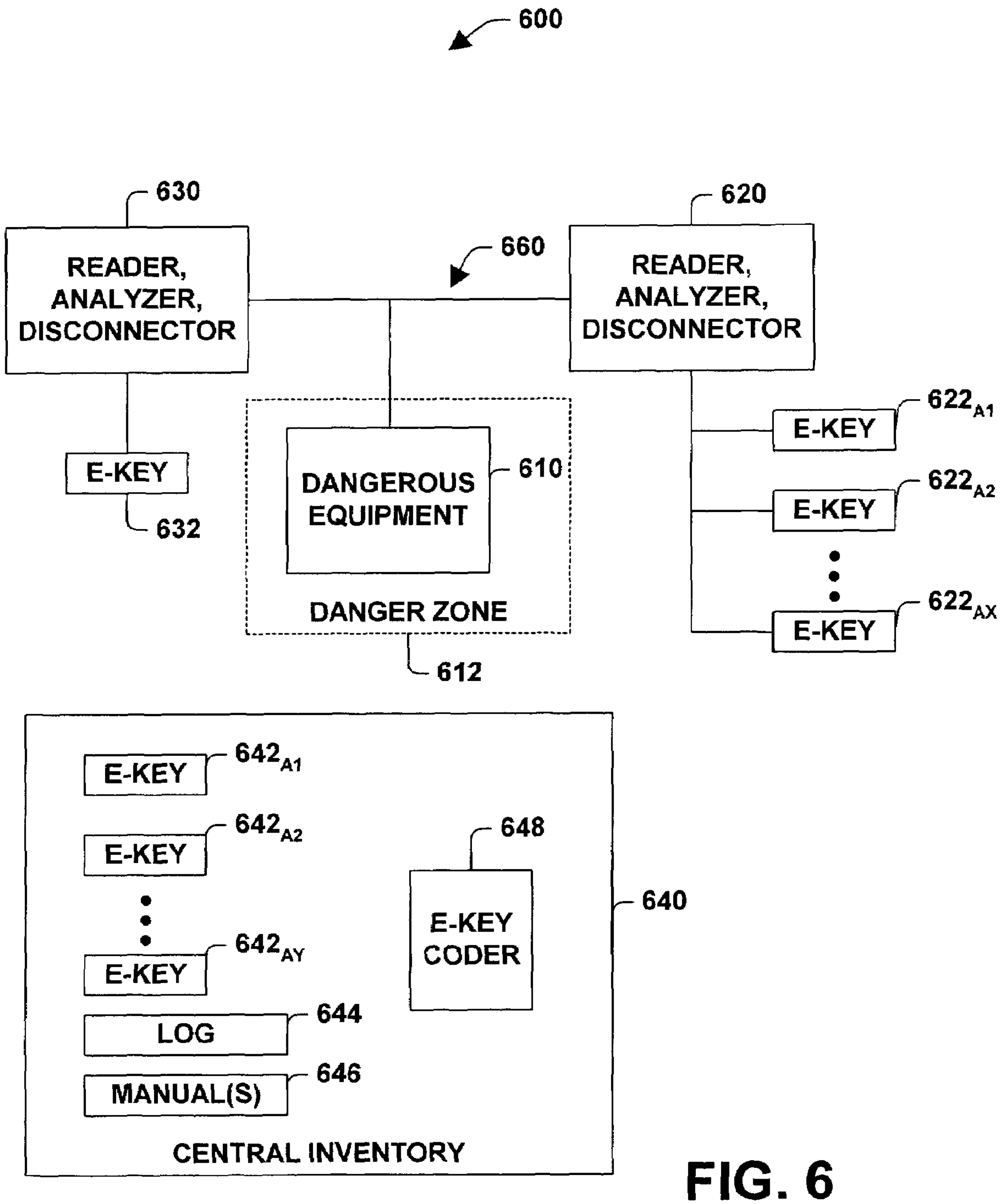
FIG. 6 is schematic block diagram of a system for electronically disabling and/or enabling the operation of a piece of dangerous equipment where the system includes a computer network to connect communicating components of the system.

The computer network 660 can connect electronic key readers, electronic key data analyzers, disconnectors and dangerous equipment. The computer network 660 can carry signals and/or data packets between the electronic key readers, the electronic key data analyzers, the disconnectors and the dangerous equipment. The signals can include, but are not limited to, electronic key data, electronic key data analysis data, equipment data and disconnect control data. By connecting devices like electronic key readers, electronic key data analyzers, disconnectors and dangerous equipment through signals related to electronic key data, electronic key data analysis data, equipment data and disconnect control data sophisticated data analysis, management and control is facilitated with resulting improvements in plant management. For example, a plant may have four electricity generators, any two of which must be operable at the same time to prevent a plant shutdown. Conventionally, using a physical lock system, physical inspection of the electricity generators may have been required to ensure that a person desiring to shut down an electric generator was not going to cause a plant shutdown. However, there were inevitable race conditions (e.g., worker 1 inspects generator 1 and determines that it is operating while worker 2 inspects generator 2 and determines that it is working while worker 3 inspects generator 3 and determines that it is operating then the three workers proceed to other generators and shut them down, confident that at least two generators will remain active). With the network 660, information may be shared between disabling components to make it less likely that such an inadvertent plant shutdown would occur. The network 660 can also facilitate aggregating data associated with one or more pieces of dangerous equipment, associated disabling components and one or more pieces of related equipment. In FIG. 6, a central inventory 640 is illustrated. It is not connected to the network 660. Such a connection will be discussed in connection with FIG. 10.

Figure 7:
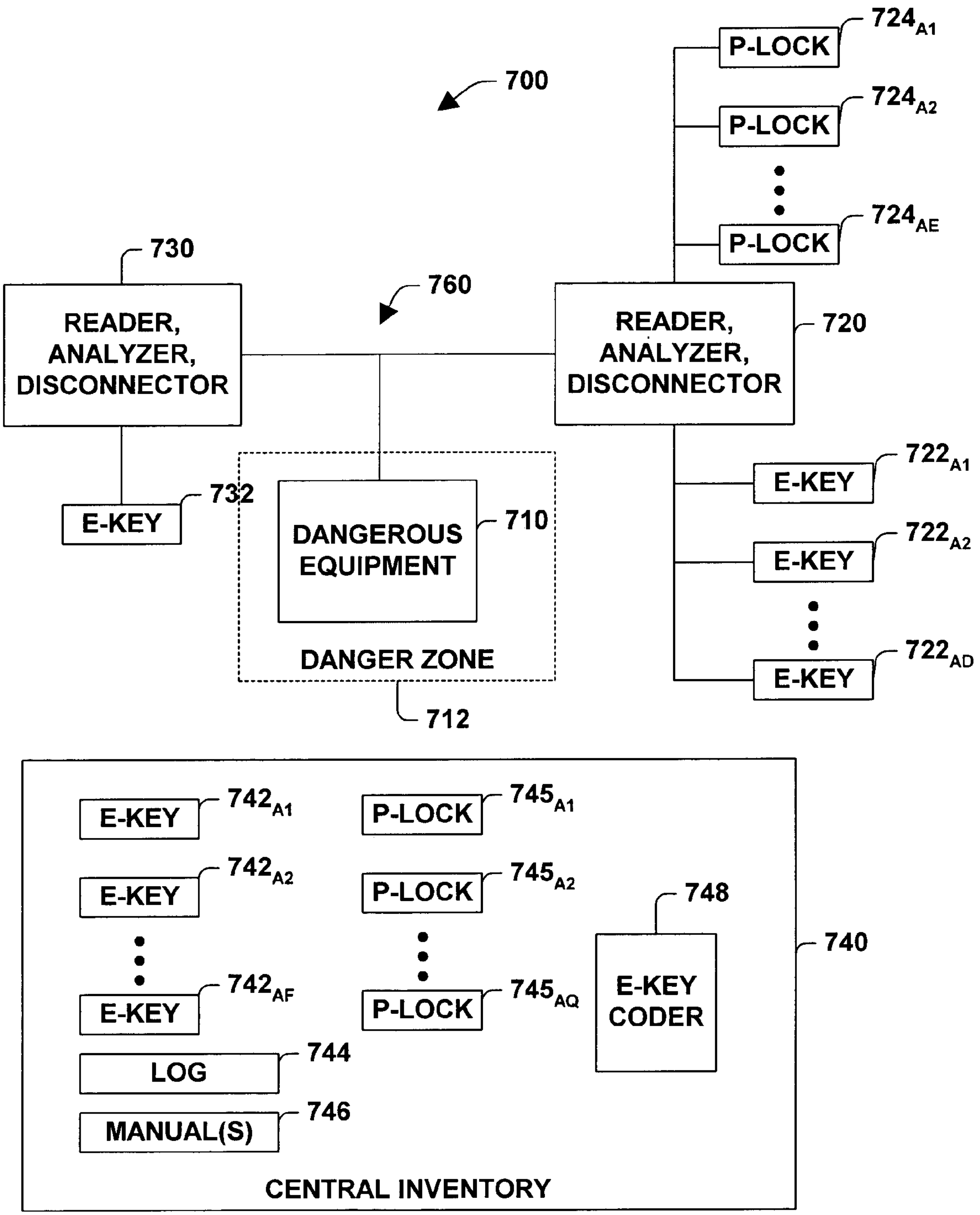
FIG. 7 is a schematic block diagram of a system for electronically and/or physically disabling and/or enabling the operation of a piece of dangerous equipment where the system includes a computer network to connect communicating components of the system and where the system is further able to interact with conventional physical locks.

FIG. 7 illustrates a system 700 for electronically disabling and/or re-enabling dangerous equipment. The system 700 includes a computer network 760 and a disabling component 720 that is able to interact with conventional physical locks. The system 700 includes one or more disabling components (e.g., disabling component 720, disabling component 730) that are substantially similar to the disabling components 220 (FIG. 2), 230 (FIG. 2), 320 (FIG. 3), 330 (FIG. 3), 420 (FIG. 4), 520 (FIG. 5) and 620 (FIG. 6). Thus, the disabling components 720, 730 can perform e-key reading, e-key data analyzing and disconnect control data processing. However, rather than communicate individually via one or more safe connections (e.g., safe connection 260 (FIG. 2)), the disabling components 720, 730 can communicate via the computer network 760, which is a safety related network.

The computer network 760 can connect electronic key readers, electronic key data analyzers, disconnectors and dangerous equipment. The computer network 760 can carry signals and/or data packets between the electronic key readers, the electronic key data analyzers, the disconnectors and the dangerous equipment. The signals can include, but are not limited to, electronic key data, electronic key data analysis data, equipment data and disconnect control data. The computer network 760 may also carry signals concerning the presence and/or absence of physical locks. For example, a disconnect device associated with the disabling component 720 may be locked by one or more physical locks (e.g., p-lock $\mathbf{724}_{A1}$ through P-lock $\mathbf{724}_{AE}$, E being an integer). The disabling component 720 may have sensors operable to detect the presence of the p-locks, and thus information concerning such p-locks may be shared by devices connected to the network 760. Thus, safety can be improved by providing built-in redundant, backup systems that employ both e-keys and p-locks.

Figure 8:
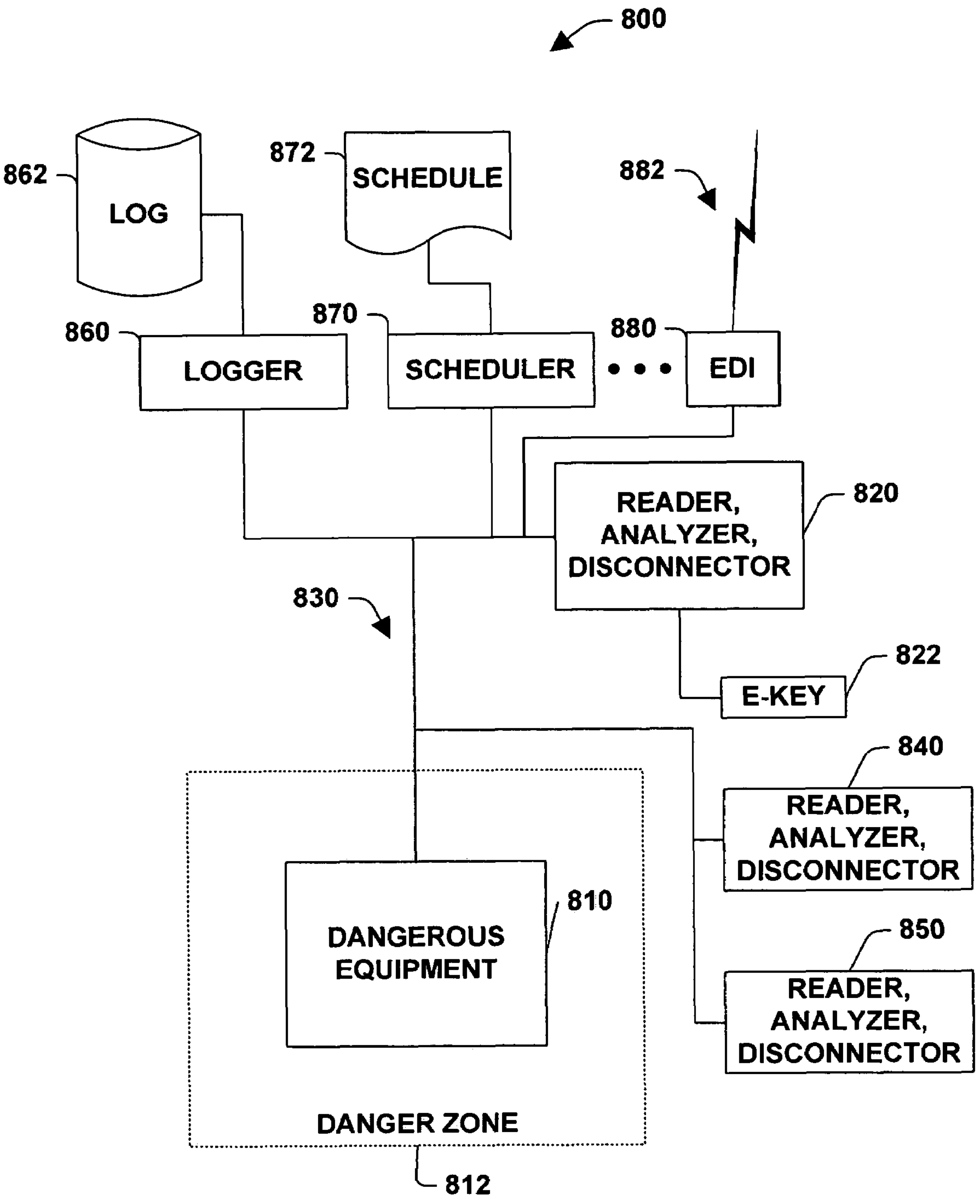
FIG. 8 is a schematic block diagram of a system for electronically disabling and/or enabling the operation of a piece of dangerous equipment, where the system facilitates additional functions like logging, scheduling and EDI exchanges, and where the system includes a computer network to connect communicating components of the system.

FIG. 8 illustrates a system 800 for electronically disabling and/or re-enabling dangerous equipment. The system 800 includes a computer network 830 and a disabling component 820 that is substantially similar to previously described disabling components (e.g., the disabling component 720 (FIG. 7)). Thus, the disabling component 820 can perform e-key reading, e-key data analyzing and disconnect control data processing. However, rather than communicate individually via one or more safe connections (e.g., safe connection 260 (FIG. 2)), the disabling component 820 can communicate via the computer network 830, which is a safety related network.

In addition to processing substantially similar to that described in connection with FIG. 7, the system 800 can, through the computer network 830, be employed to share information between additional processes including, but not limited to, logging, scheduling and EDI exchange. Thus, advantages similar to those described in connection with FIG. 4 can be achieved. However, beyond the advantages described in connection with FIG. 4, even further advantages can be achieved through sharing information associated with such additional processes between devices. For example, the dangerous equipment 810 may be connected, via the network 830 to three disabling components (e.g., disabling component 820, disabling component 840, disabling component 850). Each of the disabling components may be involved in one or more of the additional processes of logging, scheduling and/or EDI exchanges. While such additional processes provide advantages over conventional systems, economies of scale and/or more meaningful data analysis may be achievable by connecting such processes and aggregating data collected from such additional processes. Thus, the logger 860 may be able to log information for a plurality of disabling devices, and produce one or more plant wide reports, instead of the individual reports facilitated through the logger 440 (FIG. 4). Furthermore, the schedule 870 may be able to produce one or more plant-wide schedules 872 that can improve efficiency within the plant. Further still, the Edi component 880 may be able to engage in EDI exchanges 882 for the entire plant, or for a collection of devices, which may facilitate maximizing throughput on data communication lines employed for such EDI exchanges.

The network 830 facilitates storing logging data for a plurality of disabling components (e.g., disabling component 820, disabling component 840, disabling component 850) in one network log data store 862. The log data store 862 can store data in data structures including, but not limited to one or more lists, arrays, tables, databases, stacks, heaps, linked lists and data cubes. The log data store 862 can reside on one physical device and/or may be distributed between two or more physical devices (e.g., disk drives, tape drives, memory units) where such distribution is facilitated by the network 830. Further, the log data store 862 may reside in one logical device and/or data structure, with access from the plurality of disabling devices (e.g., disabling component 820, disabling component 840, disabling component 850) facilitated by the network 830.

Figure 9:
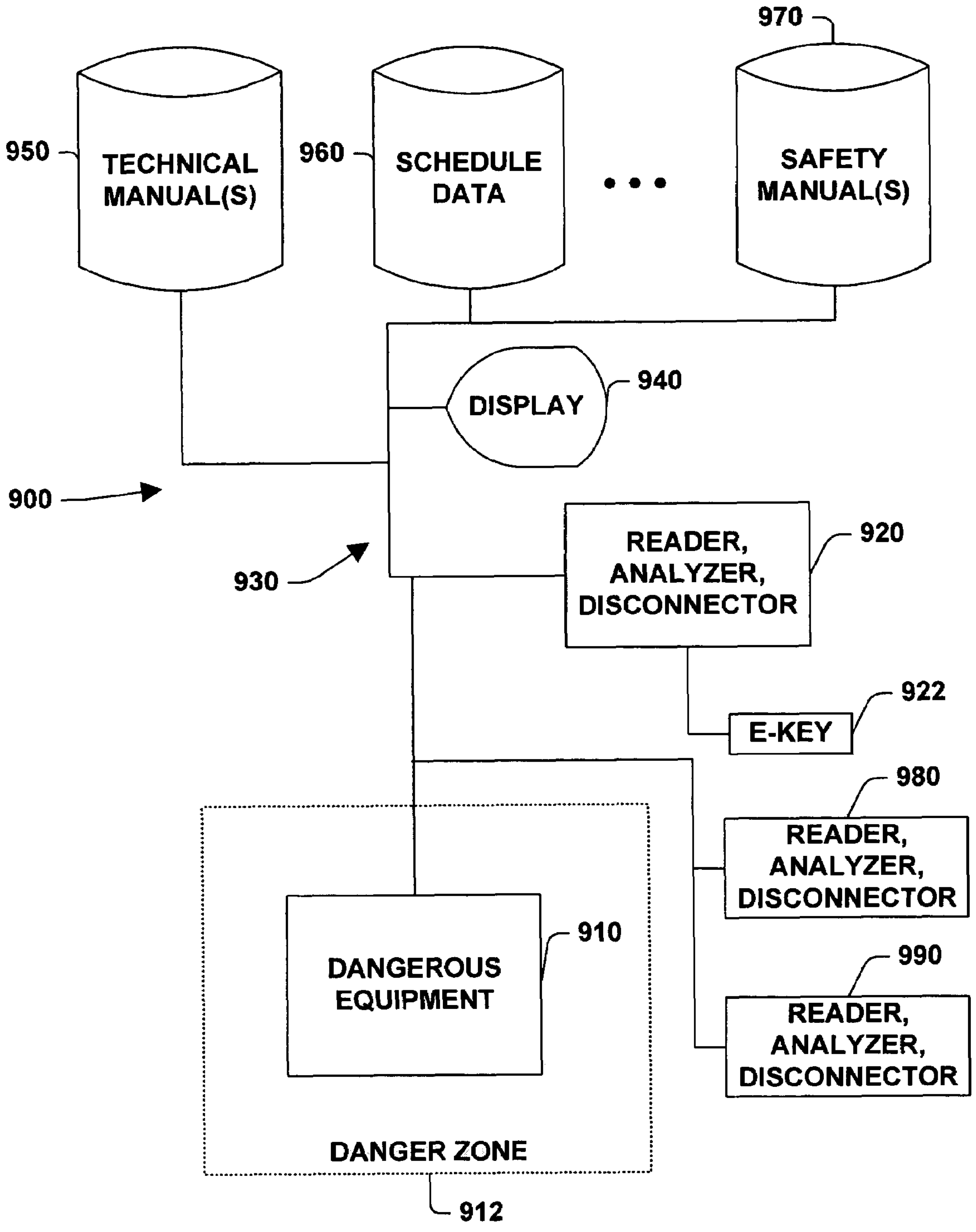
FIG. 9 is a schematic block diagram of a system for electronically disabling and/or enabling the operation of a piece of dangerous equipment, where the system facilitates the presentation of data like technical data, schedule data and safety data, and where the system includes a computer network to connect communicating components of the system.

FIG. 9 illustrates a system 900 for electronically disabling and/or re-enabling dangerous equipment. The system 900 includes a display 940 and a computer network 930. The system 900 includes a computer network 930 and a disabling component 920 that is substantially similar to previously described disabling components (e.g., the disabling component 820 (FIG. 8)). Thus, the disabling component 920 can perform e-key reading, e-key data analyzing and disconnect control data processing. However, rather than communicate individually via one or more safe connections (e.g., safe connection 260 (FIG. 2)), the disabling component 920 can communicate via the computer network 930, which is a safety related network.

In addition to processing substantially similar to that described in connection with FIG. 7, the system 900 can, through the computer network 930, be employed to share and present information including, but not limited to technical manual data, schedule data and safety manual data. Thus, advantages similar to those described in connection with FIG. 5 can be achieved. However, beyond the advantages described in connection with FIG. 5, even further advantages can be achieved through sharing such additional data between devices. For example, the dangerous equipment 910 may be connected, via the network 930, to three disabling components (e.g., disabling component 980, disabling component 990, disabling component 920), with such connection facilitated by the network 930. Each of the disabling components may access one or more of the data stores including but not limited to a technical manual data store 950, a schedule data store 960 and a safety manual data store 970.

In addition to the disabling component 920, the system 900 includes a display 940 that can be employed to present information including, but not limited to, technical manual data, schedule data, equipment identification data, equipment status information and safety manual data. Such technical manual data may be stored in one or more technical manual stores 950. The technical manual data store 950 can store data in data structures including, but not limited to one or more lists, arrays, tables, databases, stacks, heaps, linked lists and data cubes. The technical manual data store 950 can reside on one physical device and/or may be distributed between two or more physical devices (e.g., disk drives, tape drives, memory units) with such distribution facilitated by the network 930. Further, the technical manual data store 950 may reside in one logical device and/or data structure, with access to the single device and/or structure facilitated through the network 930. Similarly, schedule data may be stored in one or more schedule data stores 960 and safety manual data can be stored in one or more safety manual data stores 970, with advantages similar to those described for the technical manual data store 950.

Figure 10:
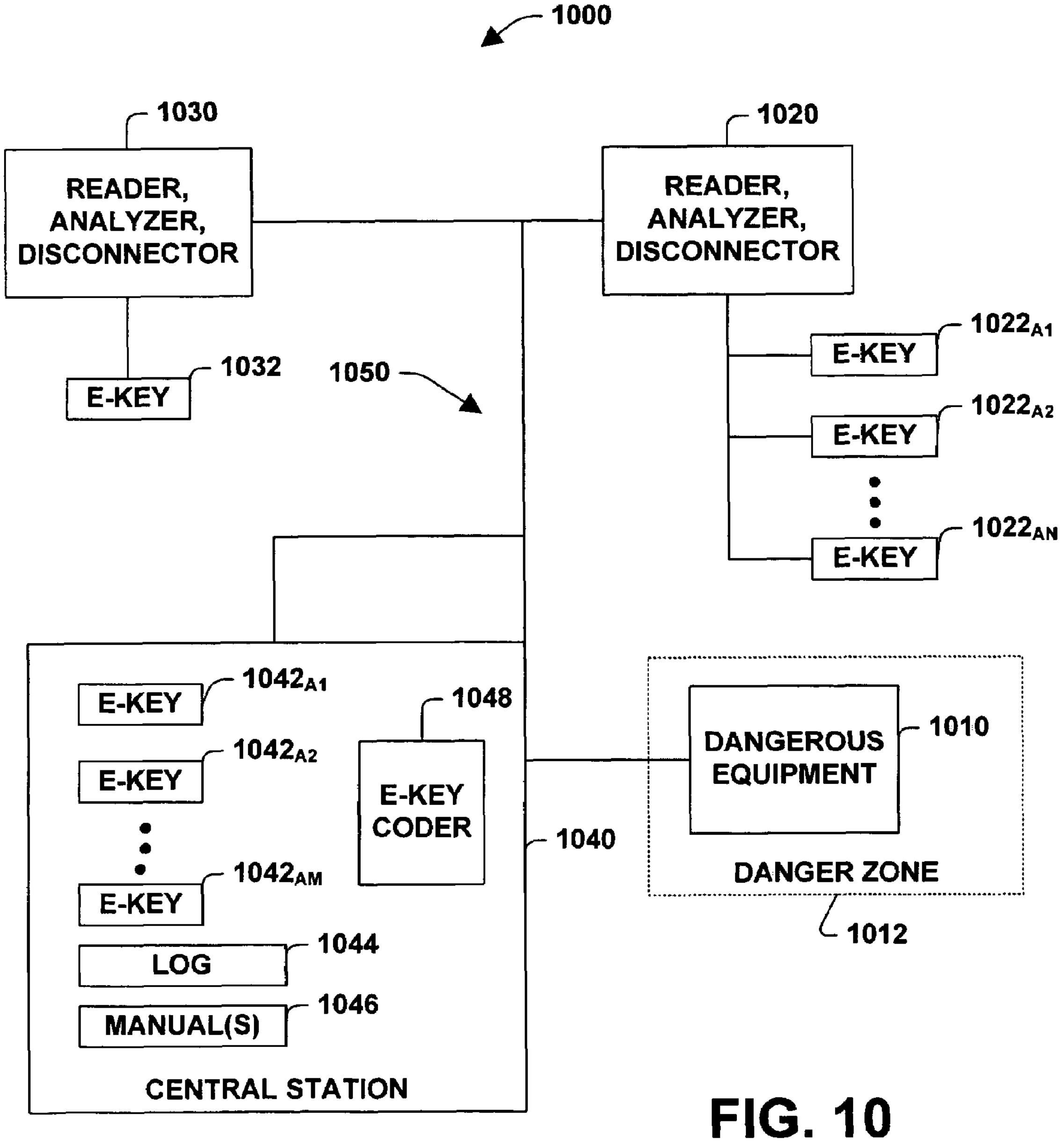
FIG. 10 is schematic block diagram of a system for electronically disabling and/or enabling the operation of a piece of dangerous equipment, where a computer network links one or more disabling components with one or more pieces of dangerous equipment and with a central station that facilitates monitoring and/or controlling the disabling components and/or dangerous equipment.

FIG. 10 illustrates a system 1000 for electronically enabling and/or disabling a piece of dangerous equipment 1010, where a computer network 1050 links one or more disabling components (e.g., disabling component 1030, disabling component 1020) with one or more pieces of dangerous equipment (e.g., dangerous equipment 1010) and with a central station 1040 that facilitates monitoring and/or controlling the disabling components and/or dangerous equipment. The system 1000 includes disabling components 1020 and 1030 that are substantially similar to the disabling components described in connection with previous figures. Thus, the disabling components 1020 and 1030 can perform e-key reading, e-key data analyzing and disconnect control data processing. Furthermore, the computer network 1050 is substantially similar to the computer networks described in connection with previous figures.

In addition to the features and advantages described in connection with FIGS. 2 and 6, the system 1100, through the network 1050, connects the central station 1040 to the other communicating components (e.g., disabling component 1020, disabling component 1030, dangerous equipment 1010). Thus, centralized control may be exercised over the communicating components and thus over the system 1100. Such centralized control can facilitate actions like, overriding local processing (e.g., disabling, enabling), providing centralized updating of logs (e.g., the log 1044), providing centralized access to manuals (e.g., the manual 1046) and providing centralized control of e-keys. Such centralized control of e-keys can improve efficiency. By way of illustration, the e-key coder 1048 can be employed from the central station 1040 to reprogram e-keys being employed at remote locations (e.g., the e-key 1032 being employed at the disabling component 1030). Thus, in a situation where a repair technician initially thought that the dangerous equipment 1010 required attention, and thus acquired an e-key operable to work with the disabling component 1020, but later realized that a different piece of dangerous equipment required attention, the e-key may be re-programmable from the central station 1040 through the network 1050, which may reduce delays associated with traveling back and forth to the central station 1040.

In a situation where a local disabling component (e.g., disabling component 1020 associated with dangerous equipment 1010) is not functioning properly, the central station 1040 may be able to perform one or more of the disabling functions based, at least in part, on one or more pieces of electronic key data and/or one or more pieces of disconnect control data transmitted across the network 1050. The central station 1040 thus can perform functions including, but not limited to enabling dangerous equipment, disabling dangerous equipment, logging electronic key data, logging times when the operation of one or more pieces of dangerous equipment is disabled, logging times when the operation of one or more pieces of dangerous equipment is enabled, logging electronic key holder medical information, logging electronic key holder tasks, logging electronic key holder identities, scheduling dangerous equipment operation, scheduling related equipment operation and performing electronic data interchange. The central station 1040 may also facilitate interfacing with other systems (e.g., fire control, security system, earthquake re-inspection monitoring system).

Figure 11:
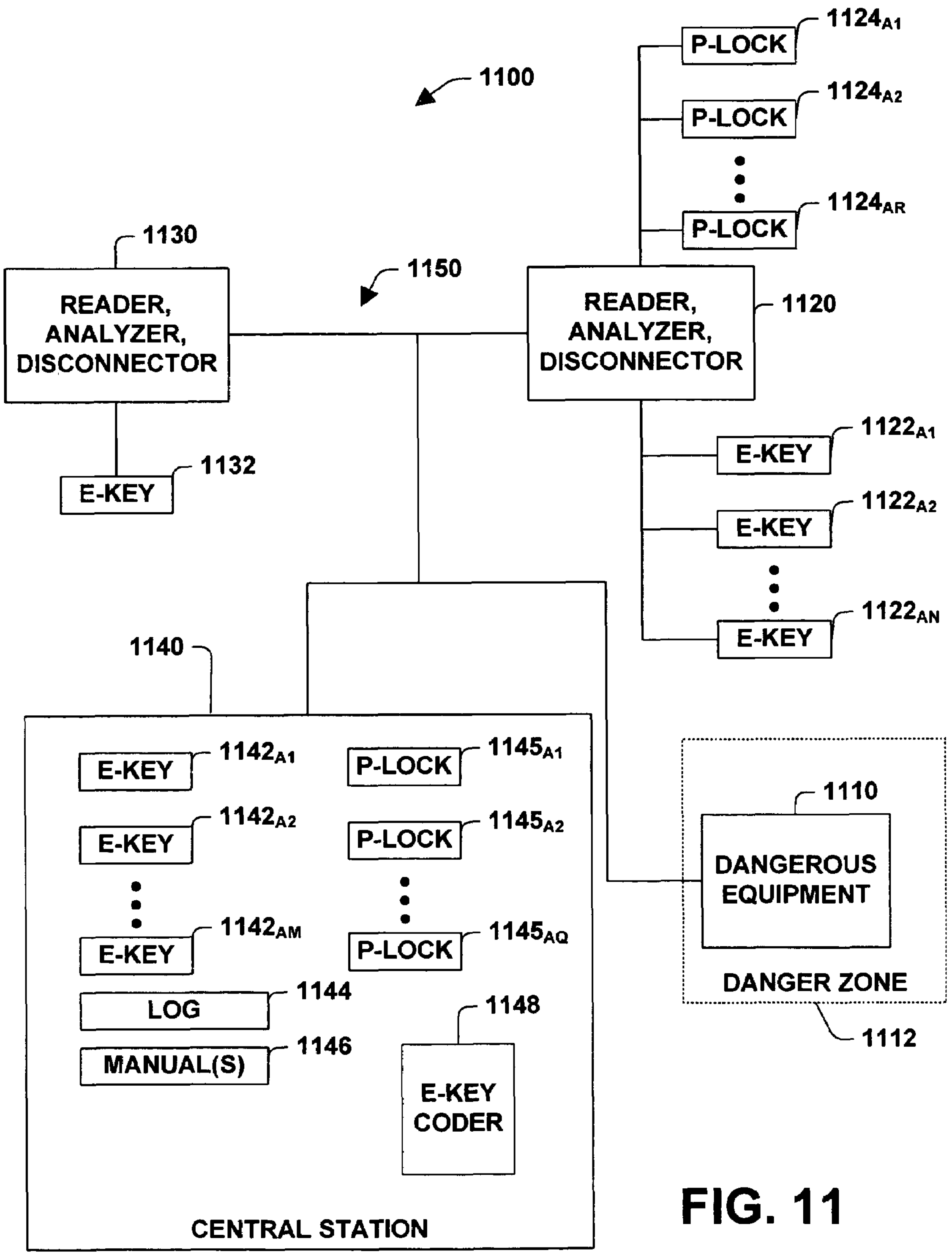
FIG. 11 is a schematic block diagram of a system for electronically disabling and/or enabling the operation of a piece of dangerous equipment, where a computer network connects a central station with cooperating components in the system to facilitate centralized control of the system and where the system is further able to interact with conventional physical locks.

Turning now to FIG. 11, a system 1100 for electronically disabling and enabling a piece of dangerous equipment 1110 is illustrated. The system 1100 includes a computer network 1150 and disabling components 1120 and 1130. The disabling component 1120 is substantially similar to the disabling components 330 (FIG. 3) and 720 (FIG. 7), and thus is able to interact with both e-keys (e.g., e-key $1122_{A1}$ through $1122_{AN}$, N being an integer) and p-locks (e.g., p-lock $1124_{A1}$ through $1124_{AR}$, R being an integer).

In addition to the features and advantages described in connection with FIGS. 3 and 7, the system 1100, through the network 1150, connects the central station 1140 to the other communicating components (e.g., disabling component 1120, disabling component 1130, dangerous equipment 1110). Thus, centralized control may be exercised over the communicating components and thus over the system 1100, with advantages similar to those described in connection with FIG. 10.

Figure 12:
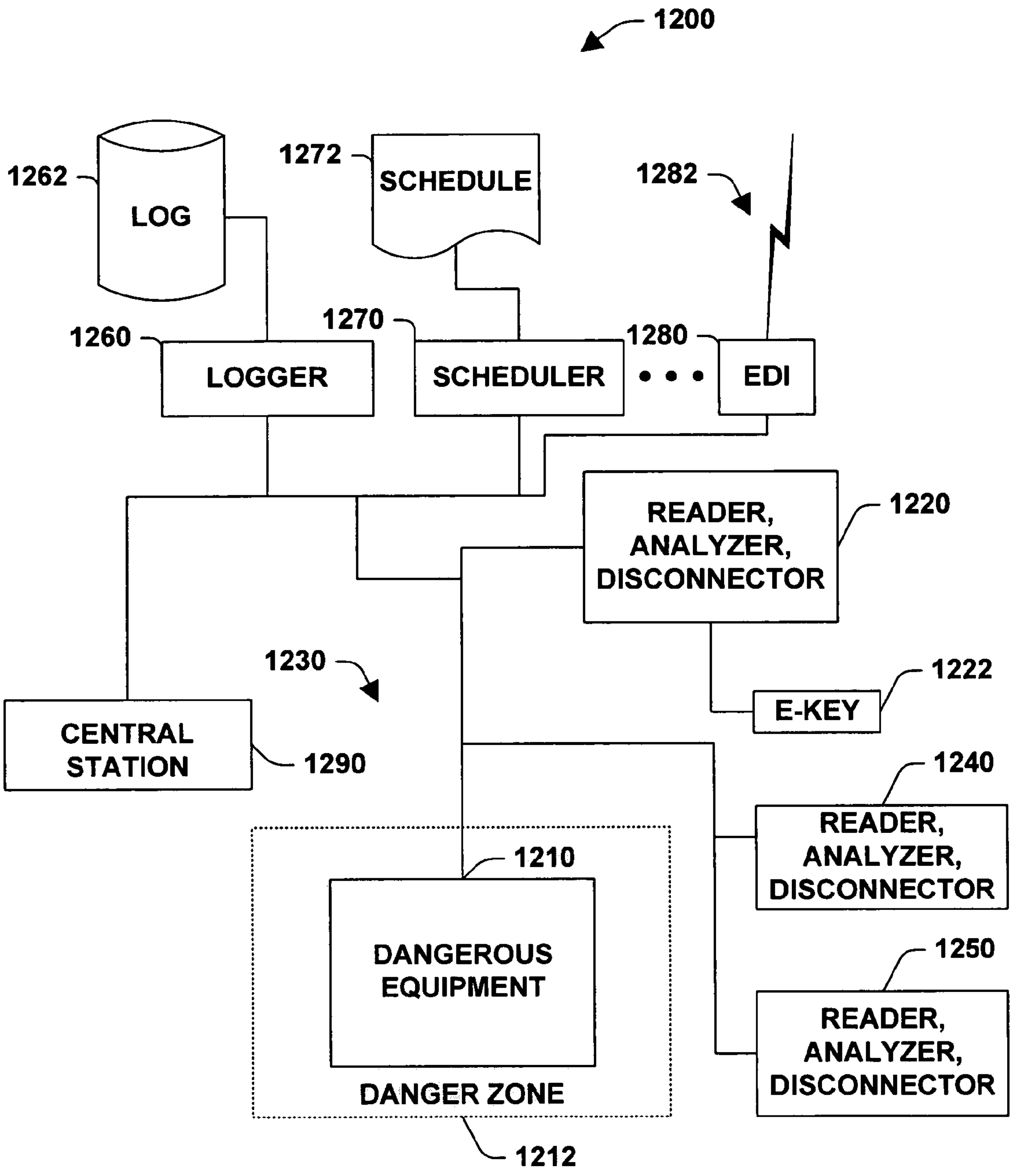
FIG. 12 is a schematic block diagram of a system for electronically disabling and/or enabling the operation of a piece of dangerous equipment, where a computer network connects a central station with cooperating components in the system to facilitate centralized control of the system.

FIG. 12 illustrates a system 1200 for electronically disabling and re-enabling a piece of dangerous equipment 1210. The system 1200 includes a computer network 1230 that connects a central station 1290 to communicating components in the system 1200 (e.g., disabling components 1220, 1240 and 1250). The disabling components 1220, 1240 and 1250 are substantially similar to the disabling components 320, (FIG. 3) 330 (FIG. 3) and 720 (FIG. 7), and thus can perform e-key reading, e-key data analyzing and disconnect control data processing and interact with both e-keys and p-locks.

In addition to features and advantages described in connection with FIGS. 4 and 8 (e.g., logging, scheduling, EDI exchanges) centralized control of such additional processes like logging, scheduling and EDI may be achieved. Thus, the efficiency of a logger 1260, a scheduler 1270 and an EDI component 1280 may be improved with corresponding improvements in the quality of a log 1262, a schedule 1272 and an EDI exchange 1282. For example, two disabling components (e.g., disabling component 1240 and disabling component 1250) may have both logged, via the logger 1260, that an inspection was performed on the dangerous equipment 1210, that a repair was scheduled via the scheduler 1270 and that a replacement part should be ordered via an EDI exchange 1282 facilitated by the EDI component 1280. By connecting the central station 1290 to the network 1230, such duplication may be caught by a process associated with the central station 1290 and thus a duplicate record may be removed from the log 1262, a duplicate repair may be removed from the schedule 1272 and one EDI exchange 1282 rather than two may be performed.

Figure 13:
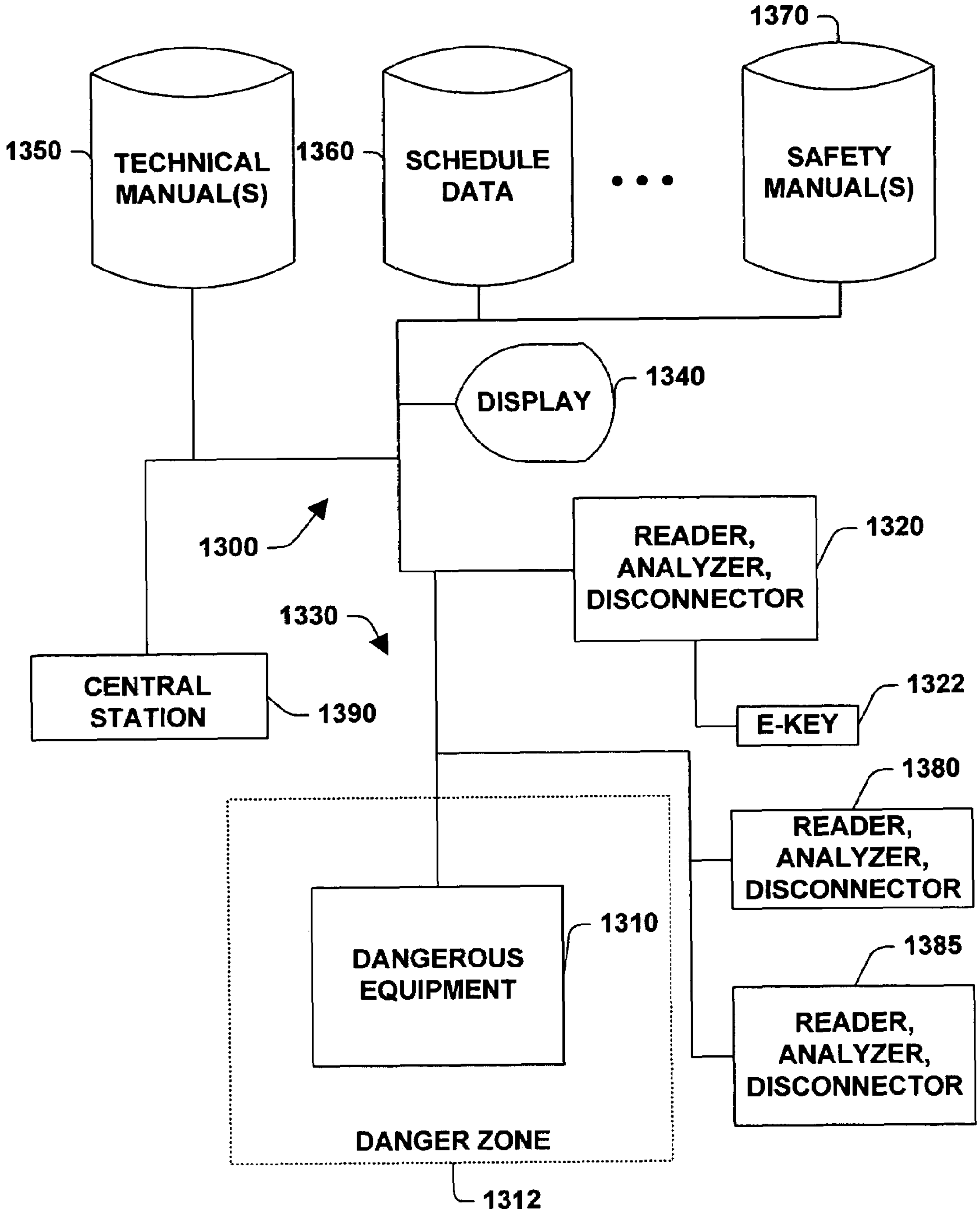
FIG. 13 is a schematic block diagram of a system for electronically disabling and/or enabling the operation of a piece of dangerous equipment, where a computer network connects a central station with cooperating components in the system to facilitate centralized control of the system.

FIG. 13 illustrates a system 1300 for electronically disabling and re-enabling a piece of dangerous equipment 1310. The system 1300 includes a computer network 1330 that connects a central station 1390 to communicating components in the system 1300 (e.g., disabling components 1320, 1380 and 1385). The disabling components 1320, 1380 and 1385 are substantially similar to the disabling components 320, (FIG. 3) 330 (FIG. 3) and 720 (FIG. 7), and thus can perform e-key reading, e-key data analyzing and disconnect control data processing and interact with both e-keys and p-locks.

In addition to features and advantages described in connection with FIGS. 5 and 9, centralized control of additional processes like displaying technical manual data, schedule data and safety manual data may be achieved. Thus, conflicts between competing processes may be resolved through the central station 1390. For example, if the disabling component 1385 and the disabling component 1380 both require atomic access to schedule data, such conflicts may be resolved by the central station 1390. Thus, access to and utilization of data stores including, but not limited to, a technical manual data store 1350, a schedule data store 1360 and a safety manual data store 1370 may be optimized.

Figure 14:
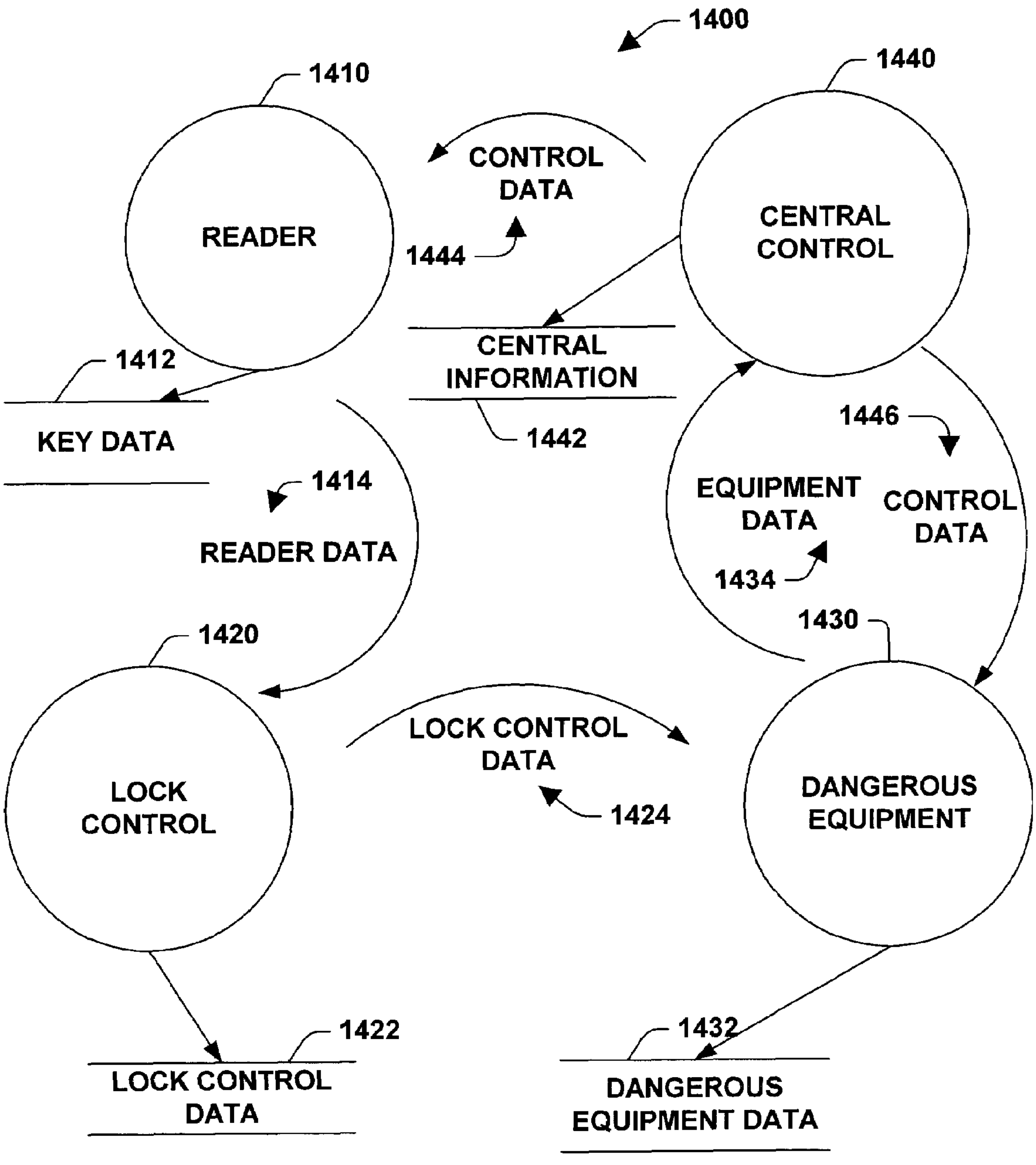
FIG. 14 is a data flow diagram illustrating the flow of data in a system for electronically disabling and/or enabling the operation of a piece of dangerous equipment.

FIG. 14 illustrates a sample data flow 1400 for a system for electronically disabling and enabling dangerous equipment. A reader process 1410 acquires e-key information from an e-key. The reader process 1410 can store the e-key data in an e-key data store 1412 and may also forward selected portions of the acquired e-key data as reader data 1414 to a lock control process 1420. The reader process 1410 may store, for example, records associated with e-key holders who desire to disable a piece of dangerous equipment, and other such e-key data.

The lock control process 1420 may store selected lock control data in a lock control data store 1422. For example, the lock control process 1420 may store records associated with readers that are providing reader data to the lock control process 1420, and e-key holders who are accessing the readers. The lock control process 1420 may analyze the reader data 1414 alone or in connection with stored lock control data 1422 and determine whether lock control data 1424 should be forwarded to a piece of dangerous equipment 1430. For example, the lock control process 1420 may examine the reader data 1414 and determine that the dangerous equipment 1430 should be disabled. Thus, lock control data 1424 may be sent to the dangerous equipment 1430.

The dangerous equipment 1430 may then store data in a dangerous equipment data store 1432. For example, the dangerous equipment 1430 may store information concerning times when it was disabled and times when it was re-enabled. The dangerous equipment 1430 may then forward equipment data 1434 to a central control process 1440. For example, the dangerous equipment 1430 may send status information (e.g., online, offline, task being performed) to the central control process 1440.

The central control process 1440 may then generate first control data 1444 that is forwarded to the reader process 1410. For example, the central control process 1440 may send control data 1444 to the reader 1410 indicating that the dangerous equipment 1430 is performing a critical function and that the reader process 1410 should not accept disabling requests for the dangerous equipment 1430, and should inform persons attempting to disable the dangerous equipment 1430 to try again later. The central control process 1440 may store records associated with such information in a central information data store 1442, which may also selectively store the equipment data 1434 received from the dangerous equipment. The central control process 1440 may also generate a second control data 1446 that is fed back to the dangerous equipment 1430. For example, the dangerous equipment 1430 may have received an enable instruction from the lock control process 1420, but the central control may override such an enable instruction by sending the control data 1446. Again, records of such overriding data may be stored in the central information data store 1442.

Although four processes, five data flows and four data stores are illustrated in FIG. 14, it is to be appreciated that a greater or lesser number of processes, data flows and/or data stores may be employed in other data flows associated with the present invention, and that other possible data flows can be employed in accordance with the present invention.

Figure 15:
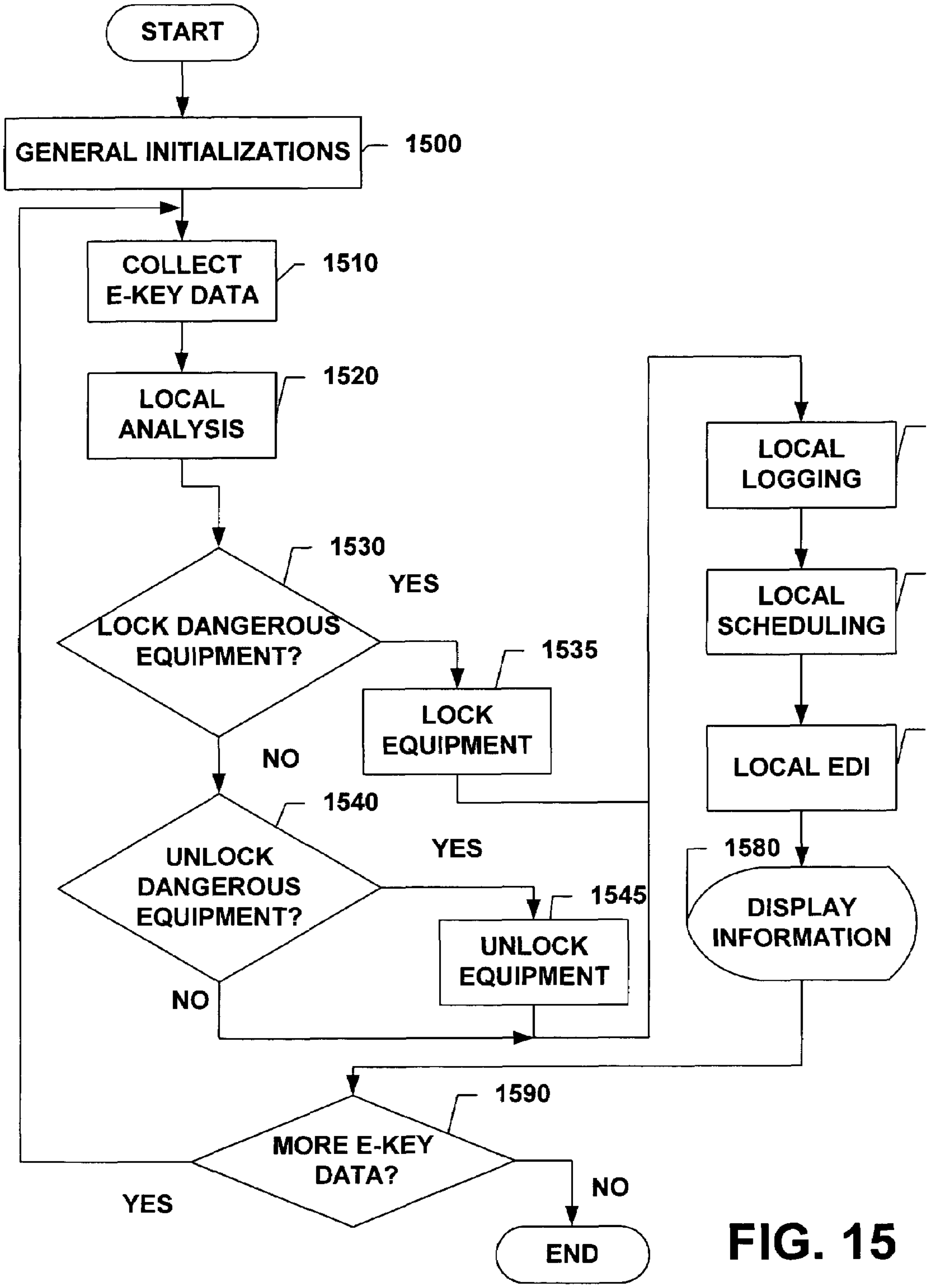
FIG. 15 is a flow diagram illustrating one specific methodology for carrying out the present invention.
Figure 16:
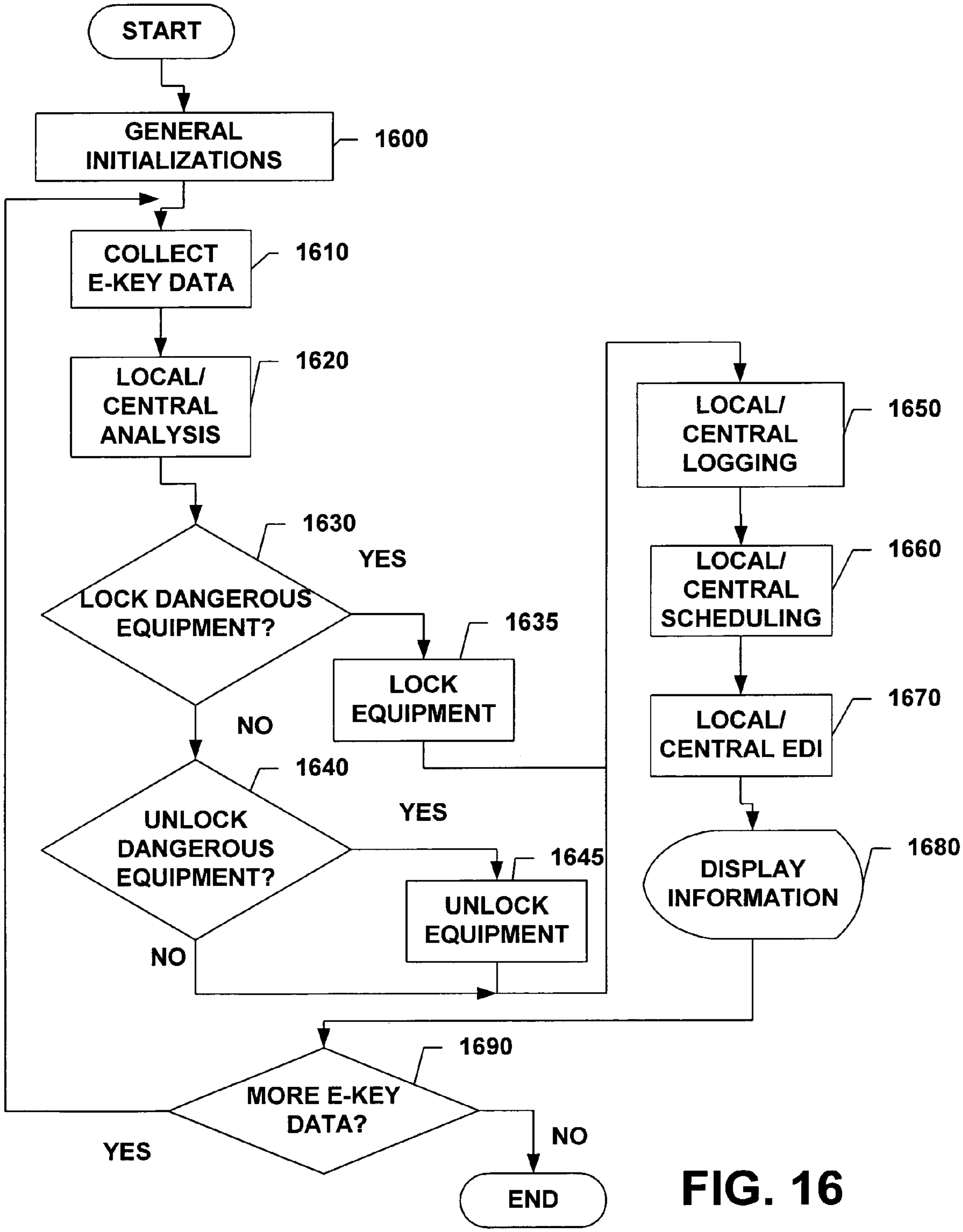
FIG. 16 is a flow diagram illustrating another specific methodology for carrying out the present invention.

In view of the exemplary systems shown and described above, methodologies, which may be implemented in accordance with the present invention, will be better appreciated with reference to the flow diagrams of FIGS. 15 and 16. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

Referring now to FIG. 15, a method for practicing the present invention is flow-charted. At 1500, general initializations are made to a method for electronically disabling and re-enabling a piece of dangerous equipment. The initializations may include, but are not limited to, establishing data communications, determining the type or types of processes and/or components available to the method and setting up data stores.

At 1510, e-key data is collected. Such data may be collected by methods including, but not limited to reading a magnetic strip on an electronic key, receiving a radio frequency signal from an e-key and reading digital data from an integrated circuit memory chip on an e-key. It will be appreciated that other methods for collecting electronic data can be employed in accordance with the present invention. At 1520, local analysis of the e-key data may be performed. As used in this application, the term "local" refers to processing performed in a stand alone system and/or process, without employing client/server of networking applications. For example, actions including, but not limited to, verifying the identity of the e-key holder, authenticating the task to be performed, retrieving information associated with technical manuals, safety manuals and schedules and querying the status of the dangerous equipment can be performed.

At 1530, a determination is made concerning whether the dangerous equipment should be locked. For example, if the identity of the e-key holder is verified, the task is authenticated, the system is enabled and the schedule of the dangerous equipment permits, then the dangerous equipment may need to be disabled. If the determination at 1530 is YES, then at 1535 the dangerous equipment may be locked. For example, flows including the flow of electricity, water, compressed air and/or hydraulic fluid may be controlled to lock the equipment in a disabled state. If the determination at 1530 is NO, then at 1540 a determination is made concerning whether the dangerous equipment should be unlocked. For example, if the e-key holder is indicating that they have completed their task, there are no other e-keys indicating that the dangerous equipment should remain locked, there are no p-locks attached to a disconnecting device and the schedule of the dangerous equipment permits, then the dangerous equipment may be unlocked and re-enabled. Thus, if the determination at 1540 is YES, then at 1545 the dangerous equipment may be unlocked. For example, flows including the flow of electricity, water, compressed air and/or hydraulic fluid may be controlled to re-enable the operation of the equipment.

At 1550, local logging is performed. For example, data including, but not limited to data associated with e-key information, equipment information, reader information and analysis information may be logged. At 1560, local scheduling is performed. For example, schedules including but not limited to schedules concerning the delivery of material to the dangerous equipment, schedules for personnel who operate the dangerous equipment and schedules for repair personnel may be generated. At 1570, local EDI processing is performed. For example, EDI exchanges including, but not limited to exchanges associated with local determinations that replacement parts should be ordered, that billing records for a repair person should be updated and that warranty information should be updated can be performed. In the method of FIG. 15, the collection of 1510, the analysis of 1520, the logging of 1550, the scheduling of 1560 and the EDI exchanges of 1570 are illustrated as being performed locally. This is an example of a method that can be performed by a stand-alone, non-networked system.

At 1580, information associated with the collection of 1510, the analysis of 1520, the logging of 1550, the scheduling of 1560 and the EDI exchanges of 1570 can be displayed to the e-key holder. Thus, at 1590, a determination can be made concerning whether further e-key data is available to the method. If more data is available, then processing returns to 1510, otherwise processing can conclude.

Referring now to FIG. 16, a method for practicing the present invention is flow-charted. The method illustrated in FIG. 16 is associated with a system where network communications are available between cooperating components in a system for disabling and re-enabling one or more pieces of dangerous equipment and where a central control is available. Thus, at 1600, general initializations are made to the method for electronically disabling and re-enabling dangerous equipment. The initializations may include, but are not limited to, establishing data communications, determining the type or types of cooperating components and setting up data stores.

At 1610, e-key data is collected. Such data may be collected by methods including, but not limited to reading a magnetic strip on an electronic key, receiving a radio frequency signal from an e-key and reading digital data from an integrated circuit memory chip on an e-key. It will be appreciated that other methods for collecting electronic data can be employed in accordance with the present invention. It will be further appreciated that the presence of network connections facilitates gathering the e-key data from a plurality of readers and forwarding such data to a central station, for example.

At 1620, local and/or central analysis of the e-key data may be performed. For example, actions including, but not limited to, verifying the identity of the e-key holder, authenticating the task to be performed, retrieving information associated with technical manuals, safety manuals and schedules, querying the status of the dangerous equipment and correlating information provided from one or more cooperating components can be performed.

At 1630, a determination is made concerning whether the dangerous equipment should be locked. For example, if the identity of the e-key holder is verified, the task is authenticated, the system is enabled, the schedule of the dangerous equipment permits and there are no conflicts between the cooperating components, as determined by local and centralized processing, then the dangerous equipment may need to be disabled. If the determination at 1630 is YES, then at 1635 the dangerous equipment may be locked. For example, flows including the flow of electricity, water, compressed air and/or hydraulic fluid may be controlled to lock the equipment in a disabled state. Furthermore, the locking of the equipment may be coupled with updating information stored at one or more locations remote from the central station. If the determination at 1630 is NO, then at 1640 a determination is made concerning whether the dangerous equipment should be unlocked. For example, if the e-key holder is indicating that they have completed their task, there are no other e-keys indicating that the dangerous equipment should remain locked, there are no p-locks attached to a disconnecting device, the schedule of the dangerous equipment permits and there are no conflicts between cooperating components, then the dangerous equipment may be unlocked and re-enabled. Thus, if the determination at 1640 is YES, then at 1645 the dangerous equipment may be unlocked. For example, flows including the flow of electricity, water, compressed air and/or hydraulic fluid may be controlled to re-enable the operation of the equipment. Furthermore, information stored at one or more locations remote from the central station may be updated as the equipment is unlocked at 1645.

At 1650, local and/or central logging is performed. For example, data including, but not limited to data associated with e-key information, equipment information, reader information and analysis information may be logged. Furthermore, the logged data may be subjected to centralized analysis to reduce, for example, duplicate and/or inconsistent log entries. At 1660, local and/or centralized scheduling is performed. For example, local schedules including but not limited to schedules concerning the delivery of material to the dangerous equipment, schedules for personnel who operate the dangerous equipment and schedules for repair personnel may be generated. Similarly, plant wide schedules including but not limited to schedules concerning the delivery of material to other dangerous equipment, schedules concerning the delivery of material to other related equipment, schedules for personnel who operate the dangerous equipment, schedules for personnel who operate other related equipment and schedules for repair personnel may be generated. At 1670, local and/or central EDI processing is performed. For example, local EDI exchanges including, but not limited to exchanges associated with local determinations that replacement parts should be ordered, that billing records for a repair person should be updated and that warranty information should be updated can be performed. Furthermore, plant wide EDI exchanges may be generated, where such plant wide EDI exchanges may supplement, replace and/or supercede the local EDI exchanges.

At 1680, information associated with the collection of 1610, the analysis of 1620, the logging of 1650, the scheduling of 1660 and the EDI exchanges of 1670 can be displayed to the e-key holder and/or to viewers located in the central control area, for example. Thus, at 1690, a determination can be made concerning whether further e-key data is available to the method. If more data is available, then processing returns to 1610, otherwise processing can conclude.

Figure 17:
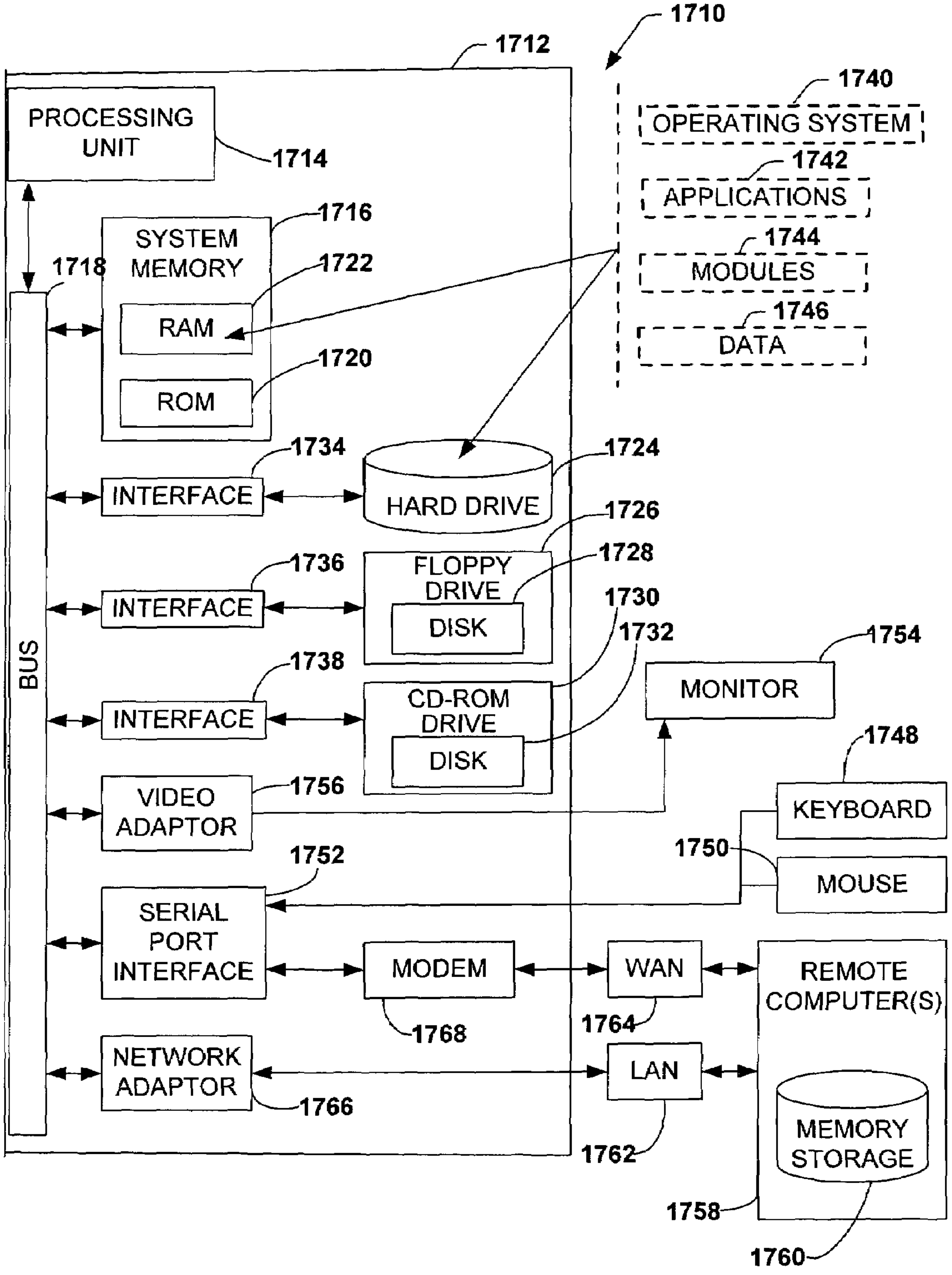
FIG. 17 is a block diagram of an exemplary operating environment for a system configured in accordance with the present invention.

In order to provide additional context for various aspects of the present invention, FIG. 17 and the following discussion are intended to provide a brief, general description of a suitable computing environment 1710 in which the various aspects of the present invention can be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 17, an exemplary environment 1710 for implementing various aspects of the invention includes a computer 1712, including a processing unit 1714, a system memory 1716, and a system bus 1718 that couples various system components including the system memory to the processing unit 1714. The processing unit 1714 may be any of various commercially available processors. Dual microprocessors and other multi-processor architectures also can be used as the processing unit 1714.

The system bus 1718 can be any of several types of bus structure including a memory bus or memory controller, a peripheral bus, and a local bus using any of a variety of commercially available bus architectures. The system memory 1716 includes read only memory (ROM) 1720 and random access memory (RAM) 1722. A basic input/output system (BIOS), containing the basic routines that help to transfer information between elements within the computer 1712, such as during start-up, is stored in ROM 1720.

The computer 1712 further includes a hard disk drive 1724, a magnetic disk drive 1726 to read from or write to, for example, a removable disk 1728, and an optical disk drive 1730 for reading, for example, from a CD-ROM disk 1732 or to read from or write to other optical media. The hard disk drive 1724, magnetic disk drive 1726, and optical disk drive 1730 are connected to the system bus 1718 by a hard disk drive interface 1734, a magnetic disk drive interface 1736, and an optical drive interface 1738, respectively. The drives and their associated computer-readable media provide nonvolatile storage of data, data structures, computer-executable instructions, etc. for the computer 1712. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 1722, including an operating system 1740, one or more application programs 1742, other program modules 1744, and program data 1746. The operating system 1740 in the illustrated computer may be any of a variety of commercially available operating systems and/or proprietary operating systems.

A user may enter commands and information into the computer 1712 through a keyboard 1748 and a pointing device, such as a mouse 1750. Other input devices (not shown) may include a microphone, an IR remote control, a joystick, a game pad, a satellite dish, a scanner, or the like. These and other input devices are often connected to the processing unit 1714 through a serial port interface 1752 that is coupled to the system bus 1718, but may be connected by other interfaces, such as a parallel port, a game port, a universal serial bus ("USB"), an IR interface, etc. A monitor 1754 or other type of display device is also connected to the system bus 1718 via an interface, such as a video adapter 1756. In addition to the monitor, a computer typically includes other peripheral output devices (not shown), such as speakers, printers etc.

The computer 1712 may operate in a networked environment using logical connections to one or more remote computers, such as a remote computer(s) 1758. The remote computer(s) 1758 may be a workstation, a server computer, a router, a personal computer, a peer device or other common network node, and typically includes many or all of the elements described relative to the computer 1712, although, for purposes of brevity, only a memory storage device 1760 is illustrated. The logical connections depicted include a local area network (LAN) 1762 and a wide area network (WAN) 1764. Such networking environments are commonplace in offices, enterprise-wide computer networks, intranets and the Internet.

When used in a LAN networking environment, the computer 1712 is connected to the local network 1762 through a network interface or adapter 1766. When used in a WAN networking environment, the computer 1712 typically includes a modem 1768, or is connected to a communications server on the LAN, or has other means for establishing communications over the WAN 1764, such as the Internet. The modem 1768, which may be internal or external, is connected to the system bus 1718 via the serial port interface 1752 to enable communications, for example, via POTS. The modem 1768 may also, in an alternative embodiment, be connected to the network adaptor 1766 to enable communications, for example, via DSL or cable. In a networked environment, program modules depicted relative to the computer 1712, or portions thereof, will be stored in the remote memory storage device 1760. It may be appreciated that the network connections shown are exemplary and other means of establishing a communications link between the computers may be used.

Described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that electronically controls a physical operation of dangerous equipment comprising:

an electronic key that stores electronic key data separately from the dangerous equipment, the electronic key data comprises at least one of key holder identity information, key holder task, and estimated time to complete the key holder task;

an electronic key reader that reads the electronic key data from the electronic key, the electronic key reader performs at least one of logging electronic key data, logging times when the operation of the piece of dangerous equipment is disabled, logging times when the operation of the piece of dangerous equipment is enabled, logging electronic key holder medical information, logging electronic key holder tasks, logging electronic key holder identity, scheduling dangerous equipment operation, scheduling related equipment operation, or performing electronic data interchange;

an electronic key data analyzer that is associated with the electronic key reader, the electronic key data analyzer analyzes the read electronic key data by determining parameters for disabling the dangerous equipment and generates disconnect control data based, at least in part, on the electronic key data; and a disconnector that is associated with the electronic key data analyzer and the dangerous equipment, the disconnector disables and re-enables operation of the dangerous equipment, based at least in part on the disconnect control data.

2. The system of claim 1, the disconnector further disables operation of the equipment based on a physical lock.

3. The system of claim 1, further comprising a display, the display presents information related to at least one of technical manual data, schedule data, equipment identification data, equipment status information and safety manual data.

4. The system of claim 1, the electronic key data comprises at least one of key identifying information, key holder medical information, key holder equipment access permissions, key holder equipment qualifications, key holder supervisor contact information, key holder security information.

5. The system of claim 1, the electronic key reader obtains the electronic key data via at least one of reading a magnetic strip on an electronic key inserted in the electronic key reader, receiving a radio frequency signal from an electronic key in transmission range of the electronic key reader and reading digital data from an integrated circuit memory chip on an electronic key.

6. The system of claim 1, the disconnector controls the flow of at least one of electricity, air, water and hydraulic fluid to the dangerous equipment.

7. The system of claim 1, further comprising a computer network, the computer network is coupled to one or more electronic key readers, one or more electronic key data analyzers, one or more disconnectors and one or more pieces of dangerous equipment, the computer network conveys a signal between one or more of the electronic key readers, the electronic key data analyzers, the disconnectors and the dangerous equipment.

8. The system of claim 7, the signal comprises at least one of electronic key data, electronic key data analysis data, equipment data and disconnect control data.

9. The system of claim 7, further comprising one or more additional disconnectors that disable operation of one or more additional pieces of dangerous equipment based on a physical lock.

10. The system of claim 7, further comprising a display, the display presents at least one of technical manual data, schedule data, equipment identification data, equipment status information and safety manual data.

11. The system of claim 7, the electronic key data comprises at least one of key identifying information, key holder identity information, key holder medical information, key holder equipment access permissions, key holder equipment qualifications, key holder supervisor contact information, key holder security information and key holder task.

12. The system of claim 7, the electronic key reader obtains the electronic key data via at least one of reading a magnetic strip on an electronic key inserted in the electronic key reader, receiving a radio frequency signal from an electronic key in transmission range of the electronic key reader and reading digital data from an integrated circuit memory chip on an electronic key.

13. The system of claim 7, the disconnector prevents the flow of at least one of electricity, air, water and hydraulic fluid to the dangerous equipment.

14. The system of claim 13, further comprising a central station interfaced with the computer network, the central station that disables the operation of one or more pieces of dangerous equipment and re-enables the operation of one or more pieces of dangerous equipment, based, at least in part, on one or more pieces of electronic key data and/or one or more pieces of disconnect control data.

15. The system of claim 14, the central station performs at least one of logging electronic key data, logging times when the operation of one or more pieces of dangerous equipment is disabled, logging times when the operation of one or more pieces of dangerous equipment is enabled, logging electronic key holder medical information, logging electronic key holder tasks, logging electronic key holder identities, scheduling dangerous equipment operation, scheduling related equipment operation and performing electronic data interchange.

16. A computer readable medium that stores computer executable components of a system that electronically controls a physical operation of dangerous equipment, the system comprising:

an electronic key reading component that reads electronic key data stored on an electronic key remote from the dangerous equipment, the electronic key data comprises at least one of key holder identity information, key holder task, and estimated time to complete the key holder task;

a logging component that logs information concerning at least one of the electronic key data, the electronic key reading component, the electronic key data analyzing component, the disconnect control data, or the disconnecting component;

an electronic key data analyzing component that analyzes the electronic key data by determining at least an optimal time to disable the dangerous equipment and produces a disconnect control data; and a disconnecting component that disables and re-enables the operation of a piece of dangerous equipment, based at least in part on the disconnect control data.

17. The computer readable medium of claim 16, further comprising a scheduling component that schedules the operation of one or more pieces of dangerous equipment.

18. The computer readable medium of claim 17 further comprising an EDI component that performs electronic data interchange.

19. The computer readable medium of claim 18 further comprising a central station component that performs at least one of logging, scheduling and EDI for one or more electronic key reading components, electronic key data analyzing components and disconnecting components.

20. A method that electronically controls a physical operation of dangerous equipment comprising:

collecting electronic key data stored separate from the dangerous equipment on an electronic key, the electronic key data comprises at least one of key holder identity information, key holder task, and estimated time to complete the key holder task;

obtaining a status of the dangerous equipment;

locally analyzing the electronic key data and producing disconnect data based, at least in part, on the analysis of the electronic key data and the status of the dangerous equipment; locally logging data associated with at least one of the collected electronic key data, the disconnect data and the dangerous equipment operation; and locally controlling the operation of the dangerous equipment based, at least in part, on the disconnect data.

21. The method of claim 20, further comprising:

locally scheduling the operation of one or more pieces of dangerous equipment based, at least in part, on at least one of the logged data, the electronic key data and the disconnect data.

22. The method of claim 21, further comprising locally engaging in or more electronic data interchanges.

23. The method of claim 20 further comprising locally displaying at least one of technical manual data, schedule data, equipment identification data, equipment status information and safety manual data.

24. A method that electronically controls a physical operation of dangerous equipment comprising:

collecting electronic key data saved on an electronic key unconnected from the dangerous equipment, the electronic key data comprises at least one of key holder identity information, key holder task, and estimated time to complete the key holder task;

centrally analyzing the electronic key data by determining at least an appropriateness of disabling the dangerous equipment to produce disconnect data based, at least in part, on at least one of the electronic key data, a status of one or more pieces of dangerous equipment, a status of one or more pieces of related equipment and an identity of the dangerous equipment; centrally logging data associated with at least one of the collected electronic key data, the disconnect data and the dangerous equipment operation; and centrally controlling the operation of at least one of one or more pieces of dangerous equipment and one or more pieces of related equipment based, at least in part, on the disconnect data.

25. The method of claim 24, further comprising:

centrally scheduling the operation of at least one of one or more pieces of dangerous equipment and one or more pieces of related equipment based, at least in part, on at least one of the logged data, the electronic key data and the disconnect data.

26. The method of claim 25, further comprising centrally engaging in or more electronic data interchanges.

27. The method of claim 26, further comprising centrally displaying at least one of technical manual data, schedule data, equipment identification data, equipment status information and safety manual data.

28. A system that electronically controls a physical operation of dangerous equipment comprising:

means for reading electronic key data from an electronic key, the electronic key stores the electronic key data separate from the dangerous equipment and the electronic key data comprises at least one of key holder identity information, key holder task, and estimated time to complete the key holder task;

means for analyzing the electronic key data, the means for analyzing the electronic key data determining at least a technique for disabling the dangerous equipment;

means for producing disconnect control data based, at least in part, on the electronic key data; means for logging data associated with at least one of the collected electronic key data, the disconnect data and the dangerous equipment operation; and means for disabling and re-enabling operation of the dangerous equipment, based at least in part on the disconnect control data.

* * * * *